United States Patent [19]

Canfield et al.

[11] Patent Number: 4,991,022

[45] Date of Patent: Feb. 5, 1991

[54] APPARATUS AND A METHOD FOR AUTOMATICALLY CENTERING A VIDEO ZOOM AND PAN DISPLAY

[75] Inventors: Barth A. Canfield; David L. McNeely; David J. Duffield, all of Indianapolis, Ind.

[73] Assignee: RCA Licensing Corporation, Princeton, N.J.

[21] Appl. No.: 340,931

[22] Filed: Apr. 20, 1989

[51] Int. Cl.⁵ .......................................... H04N 5/262
[52] U.S. Cl. ........................... 358/180; 358/22; 358/451; 382/47; 340/731
[58] Field of Search ............... 358/180, 22, 160, 287; 382/47; 340/723, 724, 731

[56] References Cited

U.S. PATENT DOCUMENTS

| | | | |
|---|---|---|---|
| 3,976,982 | 8/1976 | Eiselen | 340/172.5 |
| 4,381,547 | 4/1983 | Ejiri | 382/47 |
| 4,528,585 | 7/1985 | Bolger | 358/22 |
| 4,546,349 | 10/1985 | Prohofsky et al. | 340/731 |
| 4,564,865 | 1/1986 | Yamada | 358/287 |
| 4,602,346 | 7/1986 | Kawakami et al. | 364/518 |
| 4,623,922 | 11/1986 | Wischermann | 358/160 |
| 4,633,503 | 12/1986 | Hinman | 382/47 |
| 4,661,987 | 4/1987 | Anderson et al. | 358/160 |
| 4,746,981 | 5/1988 | Nadan et al. | 358/183 |
| 4,774,581 | 9/1988 | Shiratsuchi | 358/180 |
| 4,792,856 | 12/1980 | Shiratsuchi | 358/180 |

*Primary Examiner*—Tommy P. Chin
*Attorney, Agent, or Firm*—Joseph S. Tripoli; Eric P. Herrmann; James B. Hayes

[57] ABSTRACT

A video processing system includes apparatus for panning and magnifying portions of a source image stored in memory. Viewer control circuitry generates center coordinates of the portion of the image to be displayed and also a magnification factor. Further circuitry, responsive to the center coordinates and the magnification factor, generates starting addresses for reading the appropriate portion of the source image from memory. The system monitors the relative values of the center coordinates and the magnification factor to preclude blanking intervals of the source image from being displayed.

9 Claims, 11 Drawing Sheets

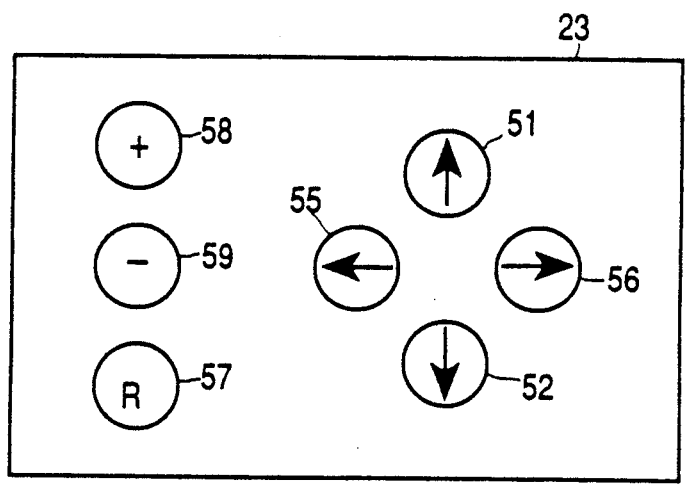
FIG. 1A ZOOM CONTROL SYSTEM

OUTPUT CONTROLLER 25

CIRCUIT TO RESTRICT ZOOM VALUES

CIRCUIT TO CORRECT DIFFERENTIALS TO CENTER

CIRCUIT TO UPDATE UPPER LEFT CORNER X COORDINATE

CIRCUIT TO UPDATE UPPER LEFT CORNER Y COORDINATE

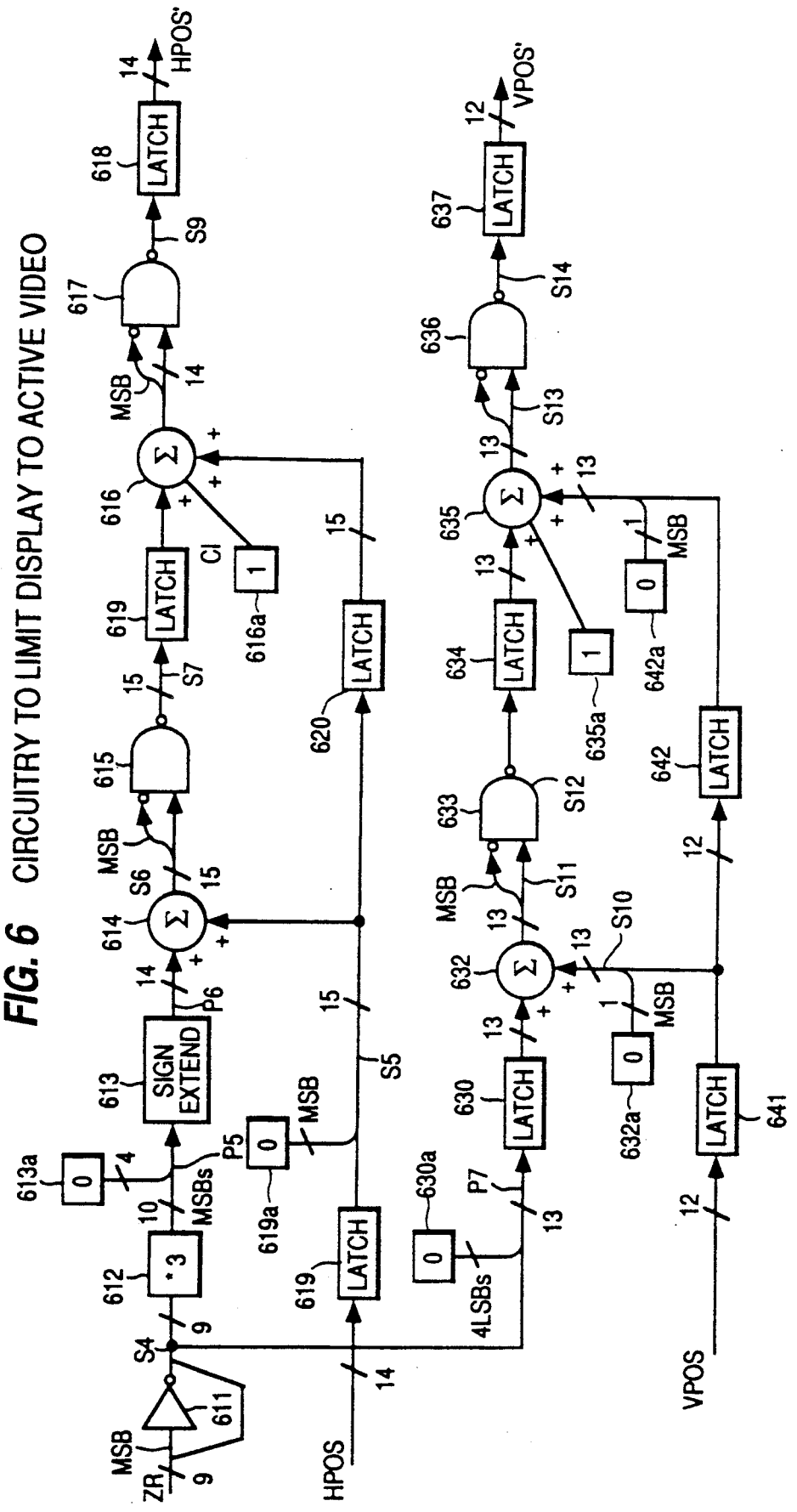
FIG. 6 CIRCUITRY TO LIMIT DISPLAY TO ACTIVE VIDEO

OUTPUT CONTROLLER

MAIN PROGRAM

FIG. 9 HORIZONTAL POSITION ROUTINE

ZOOM ROUTINE 818

APPARATUS AND A METHOD FOR AUTOMATICALLY CENTERING A VIDEO ZOOM AND PAN DISPLAY

The present invention relates to image centering apparatus for a zoom and pan video display system.

BACKGROUND OF THE INVENTION

U.S. Pat. No. 4,774,581 entitled "Television Picture Zoom System," which is hereby incorporated by reference, relates to circuitry that produces a magnified image representing a portion of a video frame from a conventional television signal. The portion of the field which is magnified, hereinafter referred to as the source portion, is determined by signals provided via viewer controls. These controls define the upper left corner of the image, in terms of horizontal and vertical pixel positions in the unmagnified field, and a magnification factor to be used to produce the magnified display.

In this referenced patent, the upper left corner of the source portion is used as a reference point when the magnification factor is changed or when the source portion is panned around the unmagnified field. However, this may not be the best reference point. Intuitively, a viewer manipulating the controls would expect the center of the image to be the reference point since this is the reference used by mechanical zoom apparatus such as photographic zoom lenses. If, for example, the upper left corner of a source portion were used as the reference point, an object of interest in the center of the picture may be moved out of the display when the magnification factor is increased.

From the point of view of the circuit designer, it is more convenient to provide the pixel positions of the upper left corner of the portion of the image to be magnified to the zoom and pan system. If, for example, the portion of the image being magnified were near an edge of the frame and the magnification factor were reduced, maintaining a constant center position would cause portions of the video signal outside of the active video region (i.e. the horizontal or vertical blanking intervals) to be included in the magnified display. Moreover, it is easier to determine the allowable limits of the source portion during a pan operation when the upper left corner is used as the reference point than when the image center is used as the reference point.

SUMMARY OF THE INVENTION

The present invention is embodied in apparatus and a method for selecting a part of a field of an input video signal to be used to produce a magnified image. This apparatus includes control circuitry which allows a viewer to select the center position of the selected part, and the magnification factor to be used to produce the magnified image. Monitoring circuitry is included in the apparatus to limit the boundaries of the selected part to be within the active video portion of the input signal. This monitoring circuitry is responsive to the horizontal and vertical coordinates of the selected center position as well as to the selected magnification factor.

BRIEF DESCRIPTION OF THE DRAWINGS

FIG. 1a is a diagram of a zoom system control suitable for use with the television receiver shown in FIG. 1.

FIG. 6 is a block diagram of circuitry which augments the controller shown in FIGS. 3, 4, 5A and 5B.

DETAILED DESCRIPTION

Figure 1:
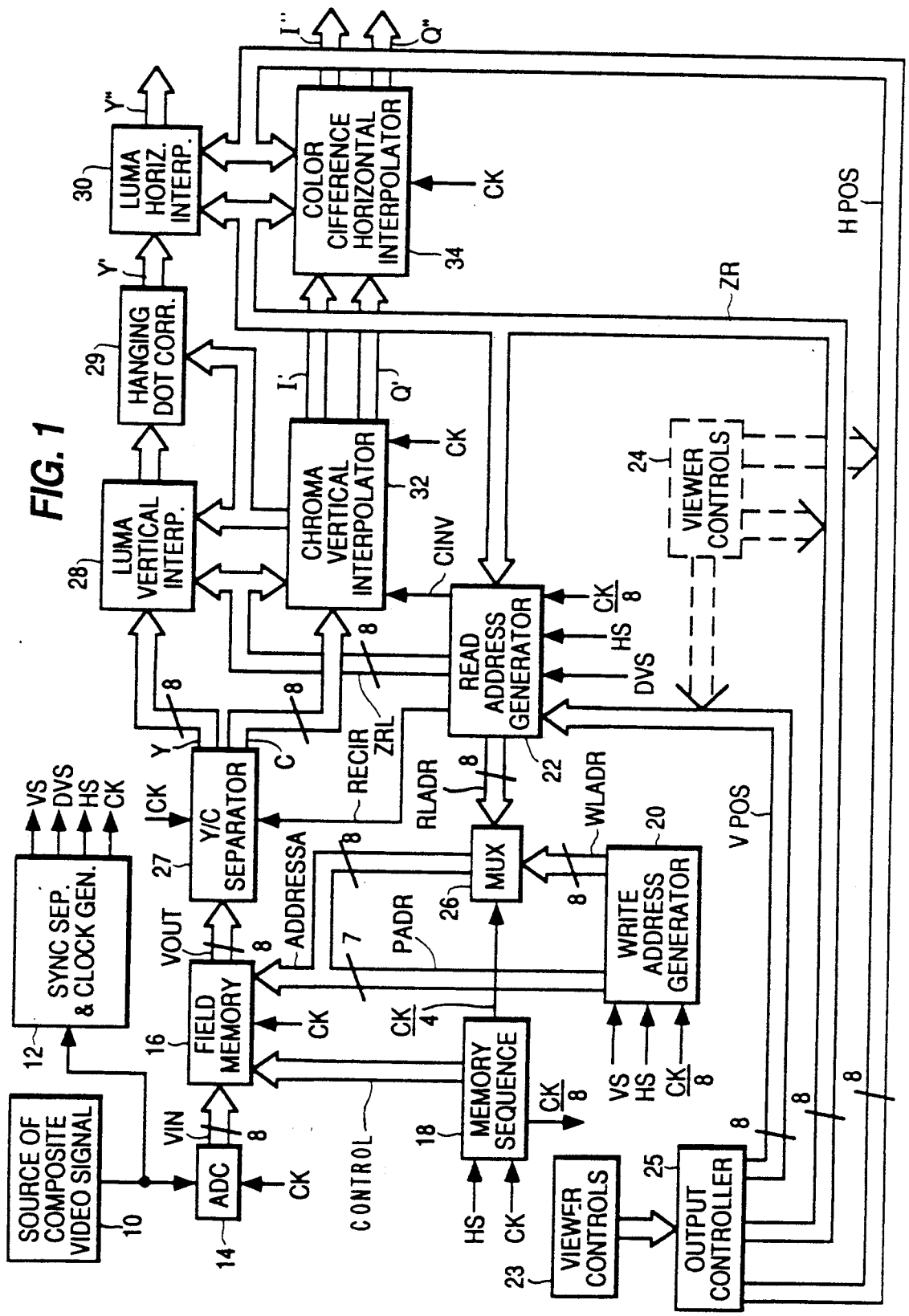
FIG. 1 is a block diagram of a television receiver which includes an image zoom feature.

The following is a brief description of the zoom system described in the above referenced U.S. Pat. No. 4,774,581 which provides a context for the present invention. In FIG. 1, a composite video signal, provided by a source 10 which, may include a conventional television tuner, provides a composite video signal to an analog to digital converter (ADC) 14. The ADC 14 digitizes this signal and applies it to a field memory 16. The memory 16 is responsive to signals provided by a memory sequencer 18 and by a write address generator 20 to write samples representing image pixels into the field memory 16. These samples are read from the memory 16, after a suitable delay, responsive to address values provided by a read address generator 22.

The sampled data composite video signal provided by the memory 16 is separated into luminance (Y) and chrominance (C) signal components by Y/C separation circuitry 27. The luminance and chrominance components are applied to respective vertical interpolator circuits 28 and 32. The interpolators 28 and 32 insert additional lines between the lines of the respective video signals provided by the circuitry 27 to effect the requested vertical magnification. The chrominance vertical interpolator 32 also separates the chrominance signal into in-phase (I') and quadrature-phase (Q') color difference signal components.

The vertically interpolated luminance signal is applied to hanging dot correction circuitry 29 which removes distorting signal artifacts, introduced in the Y/C separation process, to produce an output signal Y'. The signal Y' is applied to a luminance signal horizontal interpolator 30 and the signals I' and Q' are applied to a color difference signal horizontal interpolator 34. The interpolators 30 and 34 insert interpolated samples between the samples of the respective signals Y' and I', Q' to effect the horizontal magnification requested by the viewer.

In the above-referenced patent, the portion of the video signal provided by the source 10 which is to be used to produce the magnified image is defined by three signals provided via viewer controls 24, indicated in phantom. These signals are a vertical position value, VPOS, a horizontal position value, HPOS and a zoom ratio value, ZR. The signals VPOS and HPOS respectively define a line interval of the video field held in the memory 16 and a sample in that line interval which are at the upper left corner of the image to be magnified.

The signal ZR defines the magnification factor to be used. This value is not, itself a magnification factor but the denominator of a fraction 256/ZR which is the magnification factor. The signals VPOS and ZR are used by the read address generator 22 while the signals HPOS and ZR are used by the horizontal interpolators 30 and 34 to produce the magnified image.

Those persons skilled in the art of digital video signal processing will readily appreciate that in the more general case both starting addresses HPOS and VPOS will be applied to the read address circuitry. In addition a signal ZR or a signal representing the desired magnification will be coupled to the read address circuitry to establish the rate at which read addresses are generated. Nominally only the signal ZR or signals representing ZR will be coupled to the vertical and horizontal interpolators. Note signals representing ZR may be, for example, interpolator coefficients which may be provided by preprogrammed read only memories addressed by the values ZR.

In the present embodiments of the invention, the viewer controls 24 are replaced by an output controller 25. The controller 25 is responsive to viewer controls 23 which allow a user to specify the center of the source portion of an image and a magnification factor to be used to produce an output image. The controller 25 converts signals provided by these controls into the signals HPOS, VPOS and ZR. The controller 25 ensures that the magnified image includes only active video information, and the signals it produces properly track viewer commands to change the center of the source portion as the source portion is panned around the input field.

FIG. 1A is a diagram of an exemplary viewer control 23. These controls include vertical up and down center position controls, 51 and 52, respectively, horizontal left and right center position controls, 55 and 56, respectively, and zoom-in and zoom-out step controls 58 and 59, respectively. A reset button 57 may be provided. By pressing one of the control buttons 51, 52, 55, and 56, the viewer incrementally changes the horizontal and vertical center positions of the target image. By pressing one of the control buttons 58 and 59, the viewer incrementally increases and decreases the applied magnification factor. A constant center position is maintained while the magnification factor is changed. However, this center position may be adjusted if a decrease in magnification would cause a portion of the image beyond the raster boundaries to be displayed. By pressing the reset button, 57, the viewer may return the displayed image to a preset center position and magnification factor, for example, one to one magnification and centered in the center of the input field.

Two different hardware implementations and one combined hardware and software implementation of the output controller 25 are described below. To understand the operation of these controllers, it is helpful to first understand some mathematics used by the controllers. The zoom system shown in FIG. 1 is designed for an exemplary video image having 768 active pixels per horizontal line interval, and 256 active line intervals per field. It is understood that the methodology employed may be used for displays with different numbers of pixels per line interval and different numbers of line intervals per field.

Ten-bit data values are used to identify a horizontal pixel position. Similarly, eight-bit data values are used to identify the line interval in which a pixel resides.

During the zooming process, when the magnification factor is changing, it is desirable to maintain the appearance of a smooth, continuous transition, although the displayed image is changing in discrete steps. As the number of intermediate steps grows larger, the change appears smoother. Moreover, it is desirable to create a relatively large number of virtual positions located between the actual pixels, in order to identify a unique value for each pixel in the magnified display. To these ends, 256 virtual positions are defined between each pair of pixels in a scan line and between each pair of scan lines. These virtual positions are used to define the relative positions of the pixels and lines which constitute the magnified display. However, these virtual positions are grouped into a smaller number of interstitial positions for interpolation. In the embodiments of the invention described below, 15 interstitial pixel values may be interpolated between each pair of contiguous pixels, with a sixteenth position located at the pixel center. Likewise, each pair of horizontal scan lines has 16 interstitial line positions. Four additional bits are used to specify the interstitial pixel or line location with the required precision. Output controller 25, therefore, specifies HPOS as a 14-bit signal and VPOS as a 12-bit signal.

The maximum magnification is attained when each virtual pixel position in the zoom region is mapped to one pixel in the displayed image. This corresponds to 1/65,536th [i.e. 1/(256 * 256)]of the original picture being displayed. The magnification factor is an eight-bit value, thus, 256 different magnification steps are allowed. Since the most of the steps correspond to non-integer magnification levels, it is convenient to define a zoom ratio signal, ZR, related to the magnification in which each value of the signal ZR corresponds to a unique magnification value and the values of ZR are integers ranging from one to 256. To determine the unique zoom ratio value for any magnification level, it is only necessary to determine the fraction of the image, along a linear dimension, which is displayed and multiply by the maximum magnification value (in this case 256). In order to store the information in eight bits, rather than nine, one is subtracted from each value of the signal ZR as per the above computation, making the range of the signal ZR between zero and 255. The magnification factor, MF, is defined in terms of the signal ZR by equation (1).

$$MF = 256 / (ZR+1) \tag{1}$$

Since this magnification factor is applied uniformly across the displayed region, a pair of center point coordinates and a ZR value will uniquely define the horizontal and vertical pixel positions, HPOS and VPOS, of the upper left corner of the image. The general relationship is defined by equations (2) and (3), and the specific relationship for a 768×256 display is defined by equations (4) and (5).

$$HPOS = HC - (NHP * NIP) / (2 * MF) \tag{2}$$

$$VPOS = VC - (NVL * NIP) / (2 * MF) \tag{3}$$

$$HPOS = HC - (24)(ZR+1) \tag{4}$$

$$VPOS = VC - (8)(ZR+1) \tag{5}$$

In these equations, HPOS is the starting horizontal position, VPOS is the starting vertical position HC is the horizontal center, VC is the vertical center, ZR is the selected zoom ratio, NHP is the number of pixels in a horizontal scan line. NVL is the number of vertical lines in the display and NIP is the number of interstitial positions between any two lines or any two pixels, plus one.

In addition to allowing the user to specify a center point and a zoom factor, the output controller 25 includes circuitry which automatically corrects the center point of the viewed region so that raster boundaries are not crossed and only active video is displayed. If the magnification factor, MF, is increased while the center point of the magnified image is held at the center of the source image, only active video information will be displayed. However, once the center point of the generated image is moved away from the center of the source image, demagnification may eventually result in the display of non-active video information, i.e. the horizontal and vertical blanking intervals.

The general relationship defining the valid horizontal and vertical center positions is given by the inequalities (6) and (7) while the specific relationship for a 768 pixel by 256 line display is given by the inequalities (8) and (9).

$$(NHP*NIP)/(2*MF) \leq HC \leq NHP - *NIP*(1-1/(2*MF)) \quad (6)$$

$$(NVL*NIP)/(2*MF) \leq VC \leq NVL - *NIP*(1-1/(2*MF)) \quad (7)$$

$$24 * (ZR+1) \leq HC \leq 12288 - 24 * (ZR+1) \quad (8)$$

$$8 * (ZR+1) \leq VC \leq 4096 - 8 * (ZR+1) \quad (9)$$

Figure 2:
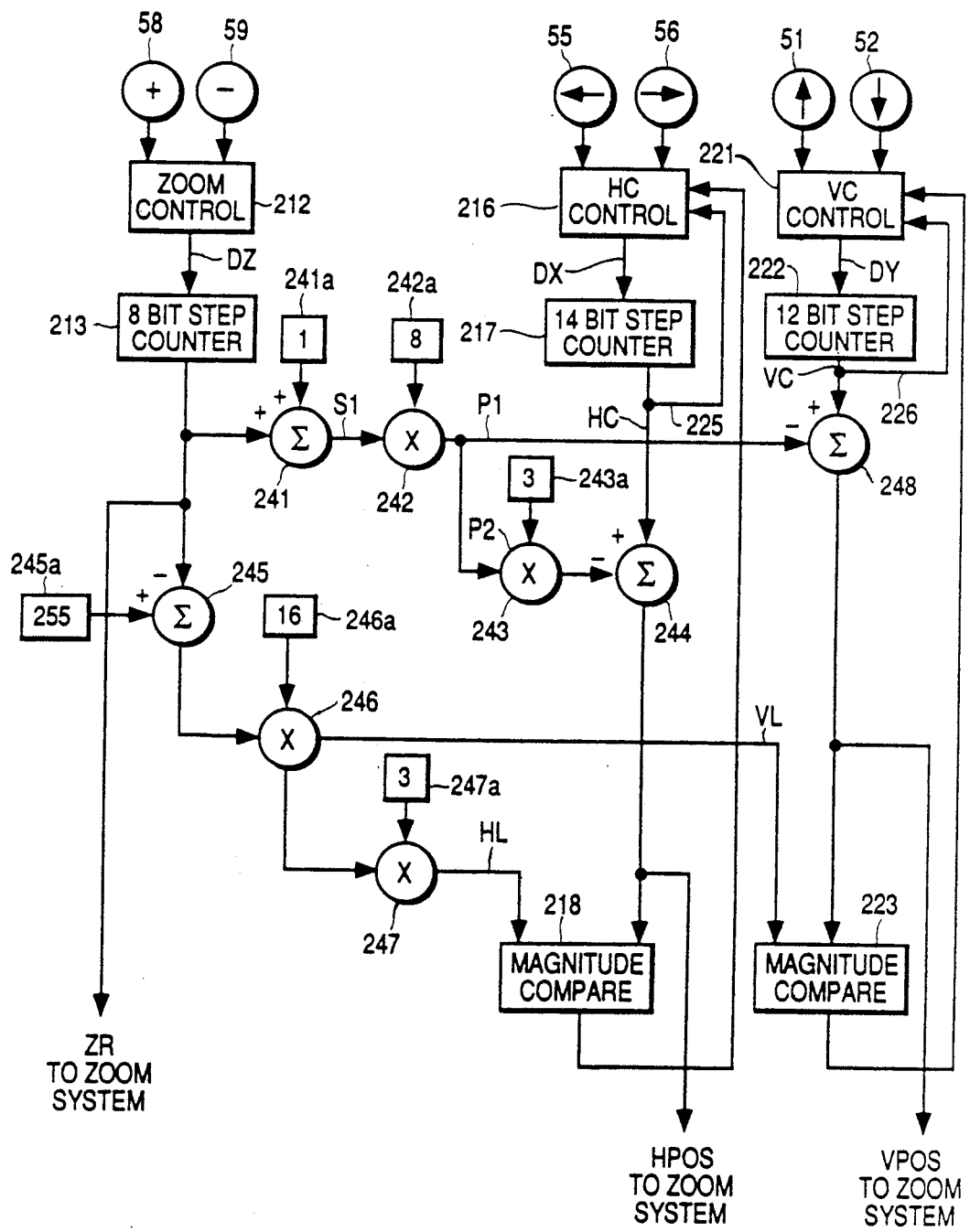
FIG. 2 is a block diagram of an output controller suitable for use in the television receiver shown in FIG. 1.

FIG. 2 is a block diagram showing components of an output controller 25 suitable for use in a first embodiment of the invention. This controller accepts the incremental signals provided by the viewer controls 23 and produces signals ZR, HPOS and VPOS for application to the zoom system as shown in FIG. 1.

To change the magnification factor, the output controller 25 accepts up and down incremental zoom control signals from the viewer controls 58 and 59, respectively. These control signals are applied to a zoom controller 212 which converts the signals into pulses that respectively decrement and increment the value held in an 8 bit up-down counter 213. The output signal of the counter 213 is the signal ZR.

The horizontal center controller 216 accepts left and right control signals provided by the viewer controls 55 and 56. These signals are converted into pulse signals which respectively decrement and increment a horizontal center counter 217. The output signal provided by the counter 217 is the horizontal center signal, HC.

In the same way, a vertical center controller 221 receives up and down control signals from the viewer controls 51 and 52. The controller 221 converts these signals into pulse signals which respectively decrement and increment a vertical center counter 222. The output signal of the counter 222 is the vertical center signal, VC.

Circuitry which includes an adder 241, multipliers 242 and 243, digital value sources 241a, 242a and 243a and a subtracter 244 produce the signal HPOS at the output port of the subtracter 244 according to the equation (4) set forth above. Similarly, the adder 241, the multiplier 242, digital value sources 241a and 242a and a subtracter 248 produce the signal VPOS at the output port of the subtracter 248 according to the equation (5) set forth above.

The signal HPOS is compared, in a comparator 218, to a signal HL which is defined by equation (10).

$$HL = 48 * (255 - ZR) \quad (10)$$

The signal HL is generated by a subtracter 245, multipliers 246 and 247 and digital value sources 245a, 246a, and 247a. The signal HL defines the right pixel limiting value for the image. If HPOS is greater than HL, a portion of the horizontal blanking interval will be displayed on the right side of the reproduced image. The left pixel limiting value for the image is zero. The comparator 218 performs the validity check set forth above in reference to equation (8) when equation (2) is used to convert the signal HC to the signal HPOS.

When the comparator 218 detects that the signal HPOS is greater than HL or less than zero, it applies a logic-one signal to the horizontal center controller 216. The controller 216 is also coupled to receive a signal, 225, provided by the counter 217 The signal 225 indicates whether the value of the signal HC is on the left or right of horizontal center of the source image, that is to say, whether the value of the signal HC is respectively less than or not less than 6144 (1800 hexadecimal). There are 12288 (768 * 16) pixels and interstitial pixels on each line of the source image. The signal 225 may be generated as the logical OR of the most significant bit (MSB) of the 14-bit signal HC with the logical AND of the next two less significant bits of the signal HC.

Responsive to these two signals, the horizontal center controller 216 conditions the counter 217 to increment its value if HPOS is invalid and HC is in the left half of the source image and to decrement its value if HPOS is invalid and HC is in the if the right half of the source image. Otherwise, the controller 216 increments or decrements the counter 217 as requested by the viewer.

The subtracter 245, multiplier 246 and digital value sources 245a and 246a are used to generate a vertical limiting signal, VL, which is defined by equation (11).

$$VL = 16 * (255 - ZR) \quad (11)$$

The signal VL represents the largest line number or interpolated line number which can be at the top of an image for a given zoom ratio. The vertical position signal VPOS is compared to the signal VL by a comparator 223.

The comparator 223 provides a logic-one output signal when the signal VPOS is greater than VL or when it is less than zero. The output signal of the comparator 223 is a logic-zero otherwise. The output signal of the comparator 223 is coupled to the vertical center controller 221. The controller 221 is also coupled to receive a signal 226 from the counter 222 which indicates that the signal VC represents a line in the upper or lower half of the source image. This signal has a logic-one value, for example, when the signal VC is greater than 2048 (800 hexadecimal) and a logic-zero value when the signal VC is less than or equal to 2048. There are 4096 (256 * 16) lines and interstitial lines in a field of the source image. The signal 226 may be, for example, the most MSB of the signal VC.

When the comparator 223 indicates that VPOS is invalid and the signal 226 indicates that the current vertical center is in the upper half or the lower half of the source image, the vertical center controller 221 conditions the counter 222 to respectively increment or decrement its value. When the comparator 223 indicates that VPOS is valid, the controller 221 conditions the counter 222 to increment or decrement its value as requested by the viewer.

Figure 3:
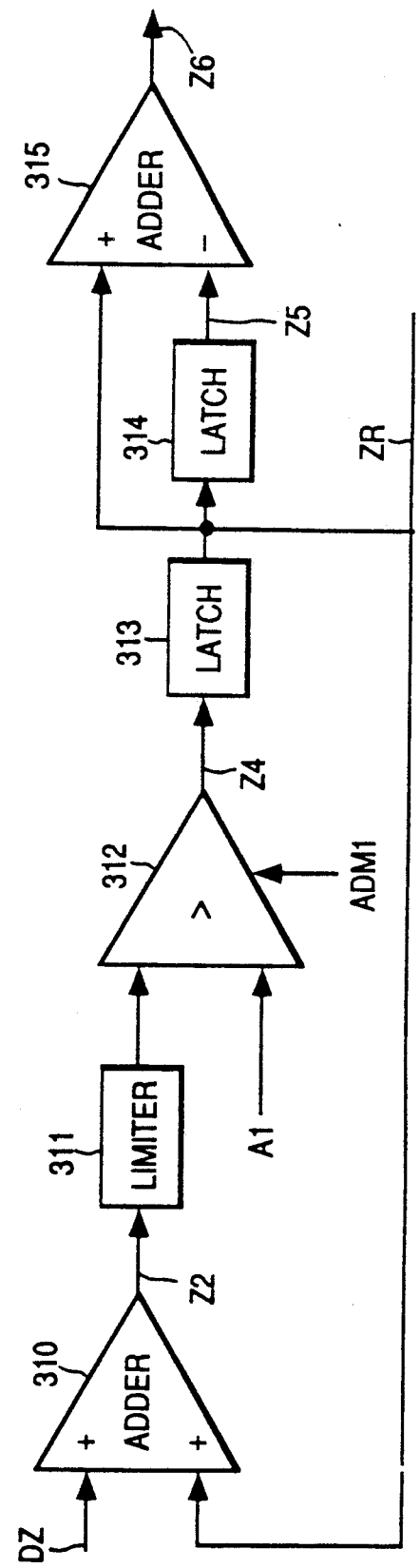
FIG. 3 is a block diagram of a portion of an alternative output controller which limits the magnification factor selected by the viewer.

FIG. 3 shows the details of a portion of an alternative output controller 23 which may be used to replace step control 212 and 8-bit counter 213, shown in FIG. 2. In the discussion of the previous embodiment of the invention, the only zoom control option for the viewer was to request an increase or a decrease in the value of ZR. FIG. 3 shows a circuit which will allow a user to change ZR or to reset ZR to a predetermined value. Switching to an absolute ZR value allows an instantaneous transition from one magnification factor to another without stepping through the intermediate magnification factors. A typical use for such a feature would be to implement a reset feature as discussed above in reference to the reset button 57 of the viewer controls 25. In these embodiments of the invention, a reset may be achieved by setting the signal ZR to 255. This reset button may also be coupled to condition the horizontal and vertical control circuitry to set HPOS and VPOS to zero, as shown below in reference to FIGS. 5A and 5B.

FIG. 3 shows a circuit which receives a signal DZ indicating a requested change in the magnification factor. This signal is generated, for example, by viewer manipulation of the magnification step controls 58 and 59. A value of $-1$ is provided when the control button 58 is pressed to increase the magnification factor and a value of $+1$ is provided when the control button 59 is pressed to decrease the magnification factor. The signal DZ is added to the zoom ratio signal ZR by an adder 310. The sum provided by the adder 310 is a user requested zoom ratio, Z2. The signal Z2 is applied to a Limiter 311 which ensures that the requested value of ER is within range and corrects the value as necessary. For the range of the signal ZR set forth above (0 to 255), the limiter may be eliminated since the signal ZR is kept within these limits by virtue of it being an eight-bit signal. It may be desirable to limit the lower value of the signal ZR to a value such as 51, to limit the maximum magnification factor to five. In this instance, the limiter 311 would establish a lower limit of 51 for the signal provided by the adder 310.

The signal Z3, provided by the limiter 311, is applied to one input port of a multiplexor 312. An absolute value, A1, for the signal ZR is applied to another input port of the multiplexor 312. The control input terminal of the multiplexor is coupled to receive an absolute/differential mode signal ADMI. The signal ADMI may be provided, for example, by the reset control button 57 of the viewer controls 23 shown in FIG. 1A Responsive to the signal ADMI, the multiplexor 312 passes either the signal Z3 or the value A1. The multiplexor 312 applies its output signal Z4 to a synchronizing latch 313. The latch 313 synchronizes the signal Z4 to the system clock signal (not shown). The output signal of the latch 313 is the zoom ratio signal, ZR, which is provided by the output controller 25 as shown in FIG. 1.

The signal ZR is also applied to the adder 310, for use in processing further zoom changes, and it is passed on to latch 314 and to one input port of a subtractor 315. In this embodiment of the invention, the latch 314 is a delay element which provides a delay of one cycle of the viewer control update clock. Typically, this clock is relatively slow, having a period on the order of a centisecond to allow the viewer to stop the zoom at any level. By subtracting the signal Z5 from the signal ZR, the zoom differential, Z6, between the current and previous values of the signal ZR may be determined. The signal Z6 may differ from the user requested zoom differential signal Z1 if the limiter 311 has made adjustments or if the system has been reset. The zoom differential signal, Z6, is used in the circuit shown in FIG. 4 to adjust the values of the signals HPOS and VPOS.

Figure 4:
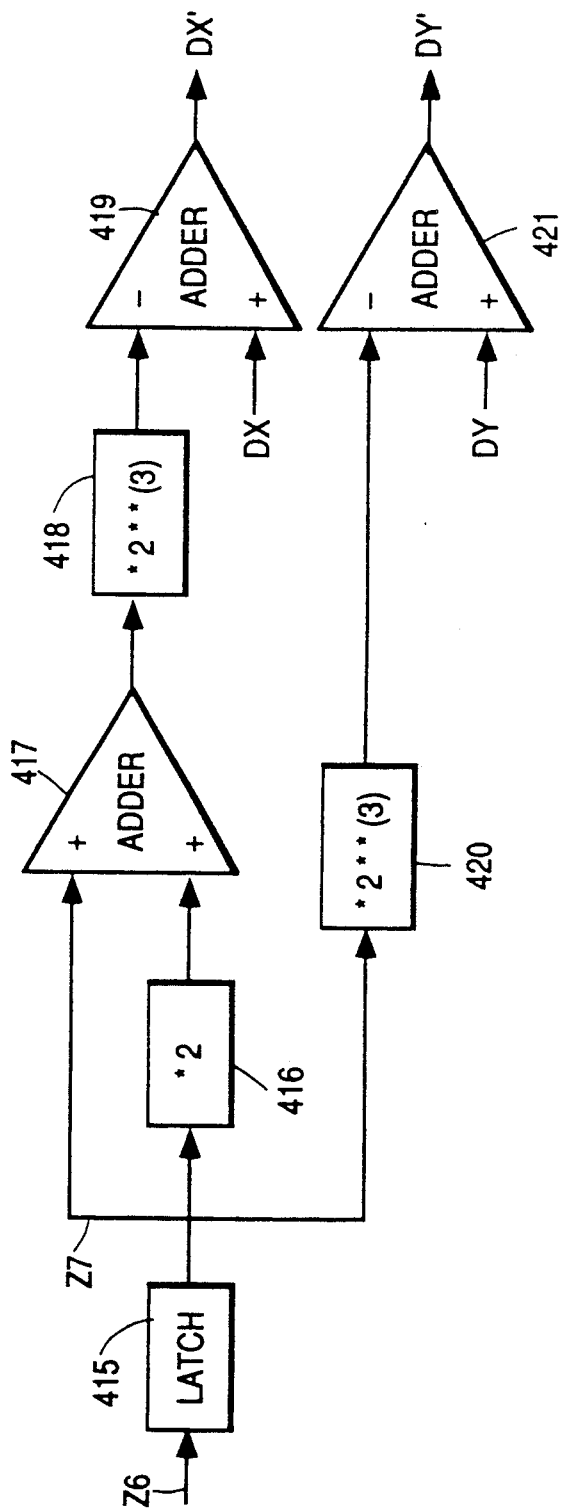
FIGS. 4, 5A and 5B are block diagrams of other portions of the alternative controller which limit the horizontal and vertical starting positions selected by the viewer.

FIG. 4 shows a circuit which corrects user requested changes to the signals HPOS and VPOS to account for changes in the zoom ratio signal ZR. The signal Z6 is stored in a synchronizing latch 415. The output signal, Z7, of latch 415 is applied to two parallel circuits which determine the adjustments to the signals HPOS and VPOS, respectively. This circuitry maintains a substantially constant image center position when the magnification factor is changed. The signal Z7 is multiplied by 24 by a shift-and-add circuitry which includes bit-shifters 416 and 418 and an adder 417. The signal provided by the shifter 418 is subtracted, by a subtractor 419, from a requested horizontal differential signal, DX, to produce a corrected horizontal differential value DX'. In the same manner, a subtractor 421 subtracts a signal representing eight times the signal Z7 from a requested vertical differential circuit DY to produce a corrected differential circuit DY'. The resulting differential horizontal and vertical signals are applied to circuitry such as that shown in FIGS. 5A and 5B which generates the respective signals HPOS and VPOS for the zoom system shown in FIG. 1.

Figure 5A:
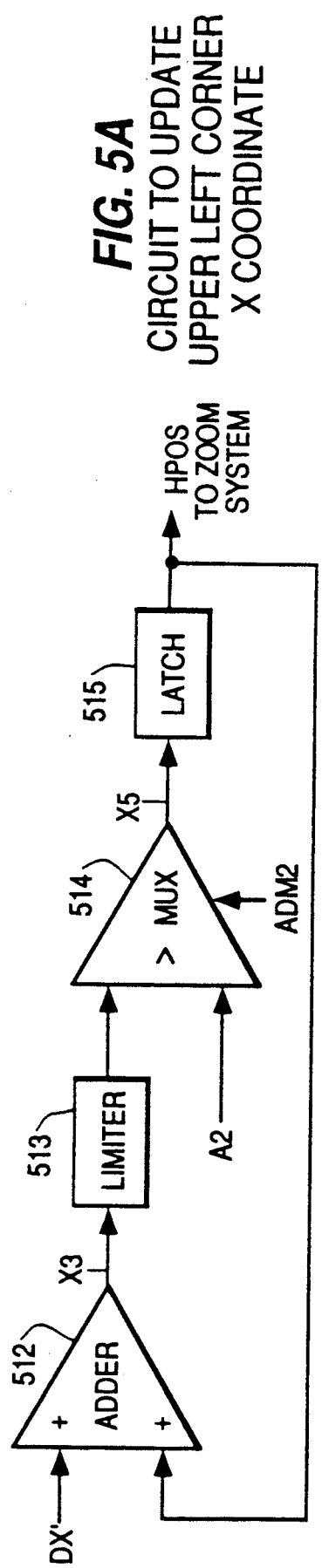
Figure 5B:
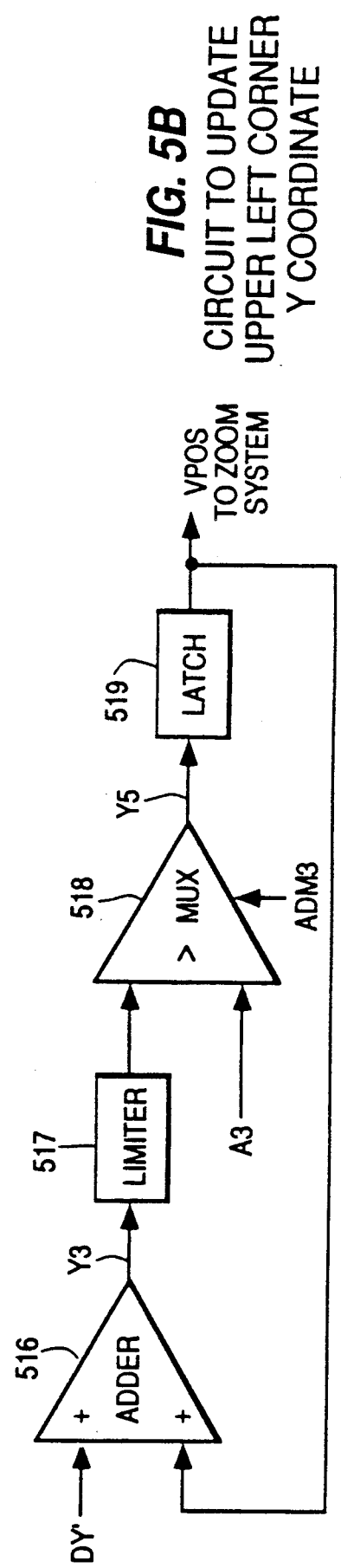

FIG. 5A shows the details of a viewer control interface which may be used to replace the horizontal center controller 216 and the horizontal center counter 217, described above in reference to FIG. 2. This circuit allows a user either to increment or decrement the signal HC or to substitute an absolute HC value for the current HC signal. FIG. 5B shows circuitry of the same type which performs the same functions for the vertical center signal VC.

In the circuitry shown in FIG. 5A, the signal DX', provided by the adder 419 of FIG. 4 is applied to one input port of an adder 512. Another input port of the adder 512 is coupled to receive the signal HPOS. The output signal of the adder 512 is a user requested horizontal position signal, X3. The signal X3 is range checked in a limiter 513. The limiter 513 ensures that the new sum is non-negative and no greater than the total number of pixels and interstitial pixels in a scan line (i.e. 12288). The output signal, X4, of limiter 513 is applied to one input port of a multiplexor 514. Another input port of the multiplexor 514 is coupled to receive an absolute horizontal position value, A2. The multiplexor 514 is conditioned by a control signal ADM2, which may be the same as the signal ADMI, to pass either the signal X4 or a preset absolute value, A2. The output signal, X5, of the multiplexor 514 is stored in a synchronizing latch 515. The output signal of the latch 515 is the signal HPOS which is applied to the zoom circuitry by the output controller 25 as shown in FIG. 1. The signal HPOS is also applied to the adder 512, as set forth above. The circuit in FIG. 5B is substantially the same as the circuit shown in FIG. 5A. The two circuits differ only in the maximum values used by respective limiters 513 and 517. The limiter 517 will allow VPOS values as large as the total number of scan lines and interstitial scan lines (i.e 4096).

FIG. 6 shows the details of circuitry which will limit the user requested HPOS and VPOS values, provided by the circuitry shown in FIGS. 5A and 5B, to prevent the display of video information outside of the active video region. This circuitry receives, as inputs, the signals ZR, HPOS and VPOS provided by the circuitry shown in FIGS. 3, 4, 5A and 5B. The output signals provided by the circuitry shown in FIG. 6 are corrected signals HPOS' and VPOS'. These signals are applied to the zoom system shown in FIG. 1 as the starting horizontal and vertical position signals. This circuitry uses substantially the same algorithm as is used by the circuitry shown in FIG. 2: it limits HPOS to be greater than zero and less than 48 * (256−ZR). It also limits VPOS to be greater than zero and less than 16 * (256−ZR).

In FIG. 6, a zero is concatenated onto the signal ZR in the MSB position to add a ninth bit. This new MSB is inverted in inverter 611, and then concatenated to the eight least significant bits (LSB's) of the signal ZR, which have not been inverted. This operation is equivalent to a twos complement subtraction of 256 from ZR. The difference value produced by this operation is applied to a conventional shift and add multiplier 612 which multiplies the difference value by three. The multiplier 612 includes a synchronizing latch (not shown). The output signal of the multiplier 612 is a ten-bit signal. Four zero bits are concatenated to this value in the LSB positions to provide a 14 bit value, P5, which represents the signal provided by the multiplier 612 multiplied by 16.

The signal P5 is extended to 15 bits by sign extending circuitry 613 which adds a fifteenth most significant bit with the same value as the fourteenth (previously the most significant) bit. This 15-bit signal, P6, is applied to an input port of an adder 614. Another input port of the adder 614 is coupled to receive a signal S5 which is the signal HPOS extended to 15 bits and delayed by a synchronizing latch 619 to be properly timed with respect to the signal P6.

The signals S5 and P6 are summed by adder 614, yielding a signal, S6. The signal S6 has a value of [HPOS +48 * (ZR−256)] which is equivalent to [48 * (256−ZR)−HPOS]. The product in the square brackets is essentially the same limiting signal that is applied to the comparator 218 in FIG. 2. The 15 bits the signal S6 are applied to respective first input terminals of a 15 two-input NAND gates 615. An inverted version of the MSB of the signal S6 is applied to the second input terminal of each of the gates 615. If the MSB is logic-zero (a positive S6), each of the 15 bits will be inverted so that the signal S7 provided by the NAND gates 615 is the ones complement representation of the signal S6. If, however, the MSB of the signal S6 is logic-one (a negative S6), the NAND gates 615 are all disabled and provide an output value having 15 ones (the ones complement of zero).

The signal S7 is applied, through a synchronizing latch 619, to one input port of an adder 616. The other input port of the adder 616 is coupled to receive the signal S5 via a synchronizing latch 620. The adder 616 has a carry-in input terminal, CI, which is coupled to receive a logic-one value. In this configuration, the adder 616 effectively converts the ones complement values provided by the latch 619 into twos complement negative values which are added to the twos complement positive values provided by the latch 620.

This operation subtracts the signal S6 from the signal S5. If S6 is negative or zero then the signal HPOS is within its valid range and a value of zero is subtracted from HPOS by the adder 616. If S6 is positive, its value is the amount by which the signal HPOS exceeds its upper limit. This value is subtracted by the adder 616 to produce a signal HPOS that is within its upper limit. However, the signal HPOS may still be less than the lower limit of zero. HPOS is limited to be within its lower limit (i.e. to be greater than or equal to zero) by a bank of 14 AND gates, 617. First input terminals of the gates 617 are coupled to receive the 14 LSB's, respectively, of the signal provided by the adder 616. Second input terminals of each of the AND gates 617 are coupled to receive an inverted version of the MSB (i.e. the sign bit) of the signal provided by the adder 616. When the signal provided by the adder 616 is negative, the AND gates 617 are disabled and provide a zero value. Otherwise, the gates 617 pass the value applied to their first input terminals.

The output signal provided by the AND gates 617 is passed through a synchronizing latch 618 to produce a signal HPOS'. This signal is the horizontal position signal that is provided to the zoom circuitry shown in FIG. 1.

A similar correction is applied to the signal VPOS. The signal S4 (i.e. the signal (ZR−256)) is multiplied by 16 by the concatenation of four logic-zero valued LSBs from a digital value source 630a. This product, the signal P7, is applied to a synchronizing latch 630. The user requested vertical center value, VPOS, is applied to a synchronizing latch 641. The 12-bit output signal of the latch 641 is extended to 13 bits by concatenating a logic-zero in the thirteenth most significant bit position. This 13 bit version of the signal VPOS is designated S10. The signal S10 is added to the signal provided by the latch 630 by an adder 632.

The output signal, S11, of the adder 632 has a value represented by the expression [VPOS+16 * (ZR−256)]. If S11 is positive, its value represents an error in the upper bound of the signal VPOS. If S11 is negative or zero there is no error. Accordingly, the signal S11 is limited to be zero or positive by a bank of 13 NAND gates 633 and subtracted from the signal VPOS by an adder 635. The adder 635 is configured in the same way as the adder 616 described above. The output signal S13 provided by the adder 635 is a VPOS signal that is limited to be within its upper bound. The signal VPOS is limited to be within its lower bound (i.e. greater than zero) by a bank of 12 AND gates 636. The output signal provided by the AND gates 636 is applied to a synchronizing latch 637 which provides the fully limited signal VPOS'. This signal is the vertical position signal that is applied to the zoom system shown in FIG. 1.

The signals HPOS' and VPOS', provided by the circuitry shown in FIG. 6, are limited to produce a magnified image that is always entirely within the active video region.

FIGS. 7 through 10 illustrate a third embodiment of the present invention. In this system, the horizontal and vertical center positions are adjusted by a microprocessor 712 as incremental changes are requested using the viewer controls 23. The horizontal and vertical center positions are stored and manipulated as eight-bit values. These values are converted into respective 14 and 12 bit starting pixel values, HPOS and VPOS, respectively, which are applied to the zoom system shown in FIG. 1. Using this method, the value of HPOS is adjusted in increments of three pixels of the source image and the value of VPOS is adjusted in increments of one scan line of the source image. The microprocessor 712 also adjusts the magnification factor by incrementing or decrementing the zoom ratio signal, ZR. The magnification factor is limited to a range between one-to-one and five-to-one. When the signal ZR is adjusted, the horizontal and vertical center positions are reevaluated to determine if further adjustment of these signals is desirable to prevent the display of the blanking intervals.

An assembly language listing of the program which controls the microprocessor 712 is included as an appendix to this specification. The program is written in assembly language for a HD63B01YO microprocessor manufactured by Hitachi, Inc.

Figure 7:
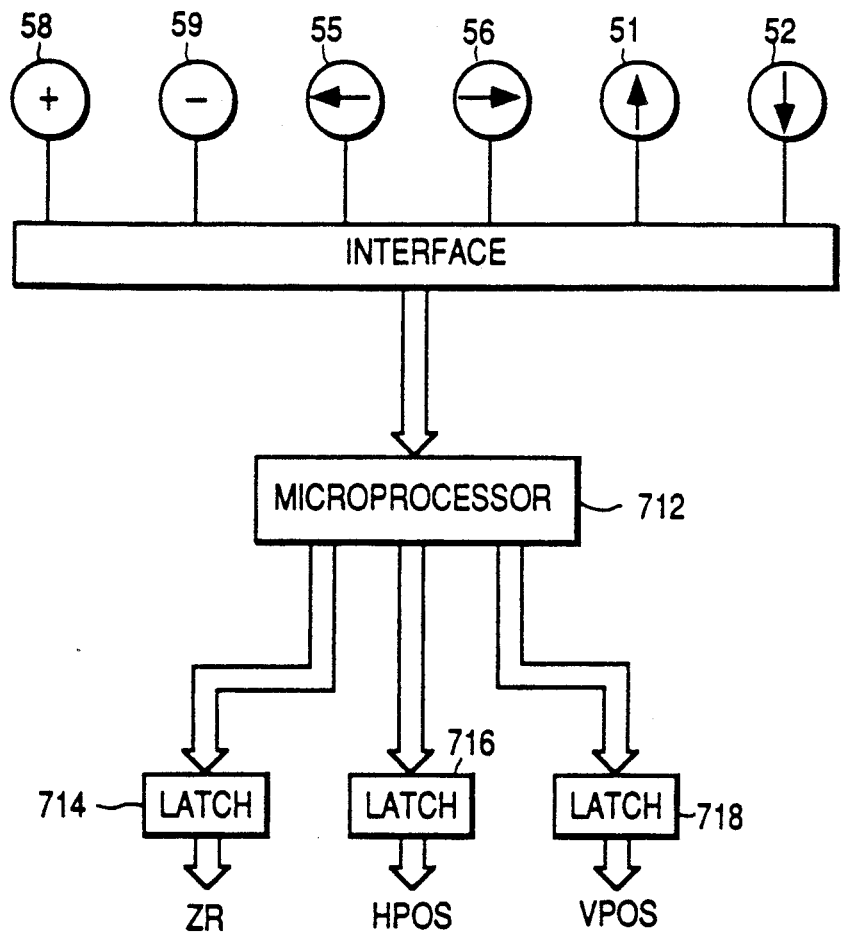
FIG. 7 is a block diagram of a second alternative output controller which limits the magnification factor and vertical and horizontal starting positions selected by the viewer.

In FIG. 7, the viewer control buttons, 51, 52, 55, 56, 58 and 59 are coupled to interface circuitry 710. This circuitry translates the action of the viewer pressing one or more of the buttons into a sequence of commands for a microprocessor 712. In the present embodiment of the invention, the operator control 23 is a remote control transmitter and The interface 710 is circuitry internal to the remote control transmitter, which generates a sequence of infra-red signals, and circuitry internal to the television receiver, which translates these signals into commands for the microprocessor 712.

The microprocessor 712 interprets these incremental commands to produce signals ZR, HPOS and VPOS for application to the zoom system shown in FIG. 1. The signals ZR, HPOS and VPOS are stored, by the microprocessor 712, in respective latches 714, 716 and 718 as they are calculated.

Figure 8:
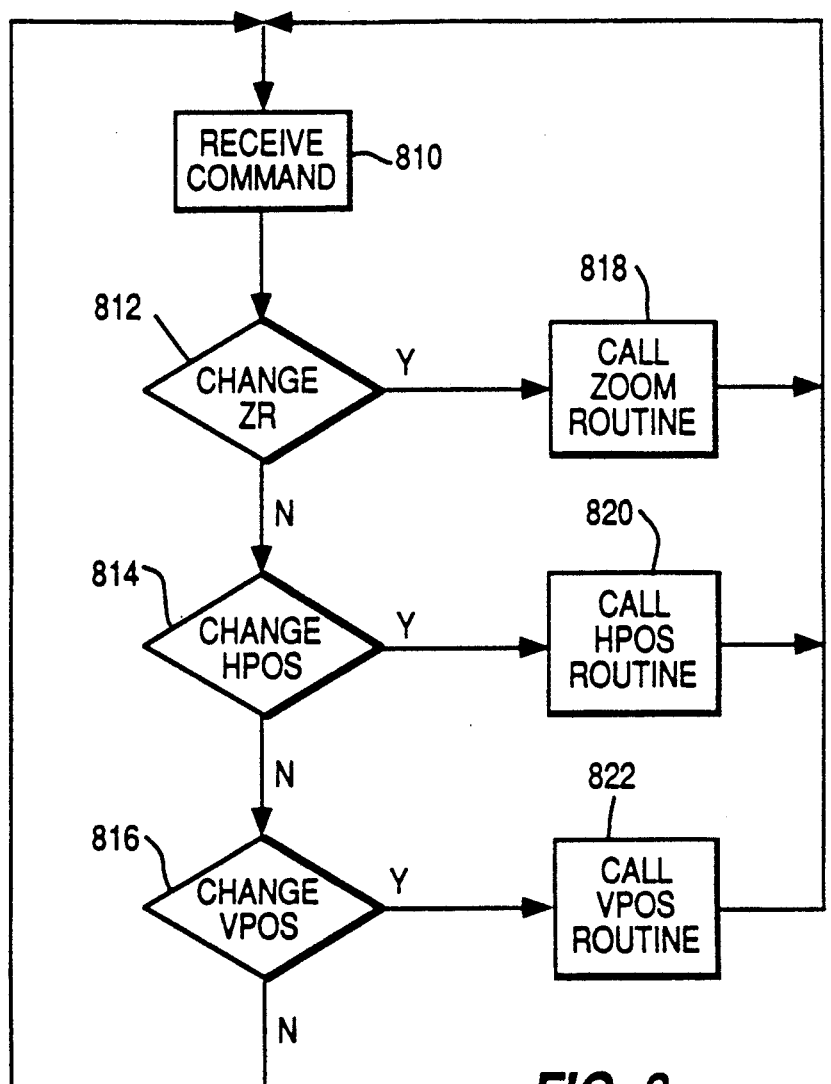
FIGS. 8, 9 and 10 are flow chart diagrams useful for explaining the operation of the controller shown in FIG. 7.

FIG. 8 is a flow-chart diagram of an exemplary main program which is executed by the microprocessor 712 to generate the signals ZR, HPOS and VPOS. In FIG. 8, commands are received from the interface 710 at step 810. Step 812 determines if the command is an adjustment of the signal ZR. If so, it invokes a zoom routine at step 818. If the command is not a zoom adjustment, step 812 transfers control to step 814 which invokes a horizontal position routine, at step 820, if the command is for a horizontal center position adjustment. If the command is neither a zoom change nor a horizontal position change step, control passes to step 816 which determines if the command is a vertical center adjustment. If so, the command 816 invokes a vertical position routine at step 822. If the command was not a vertical center adjustment command, control is transferred to the step 810 to await the next command. After the routines invoked at the steps 818, 820 and 822 have returned control to the main program, the step 810 is executed to await the next command.

Figure 9:
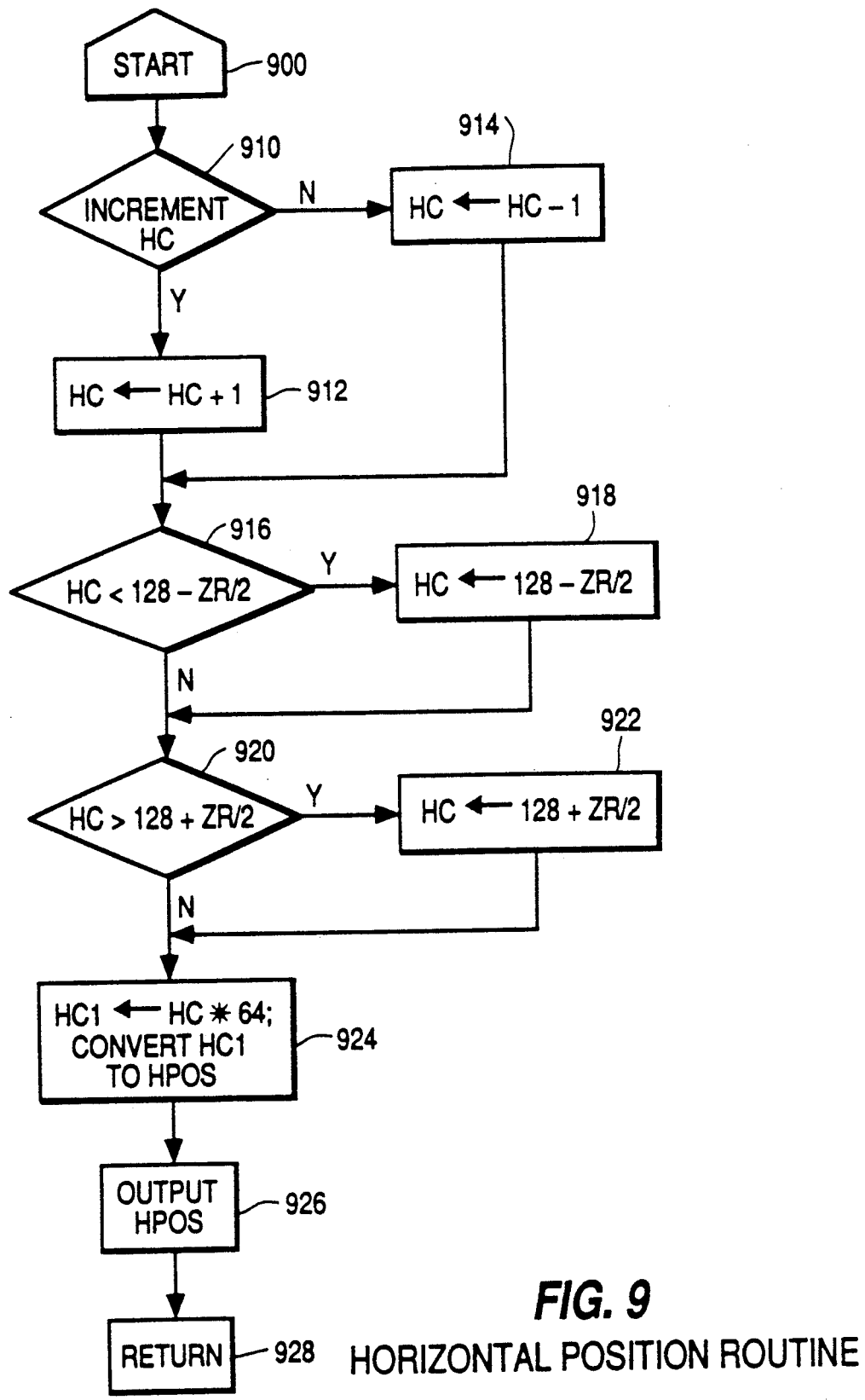

FIG. 9 is a flow-chart diagram of an exemplary horizontal position routine. This routine begins at step 900 which receives the command from the main program. Step 910 tests the type of the received command to determine if it is an increment command or a decrement command. If it is an increment command, step 912 is executed which adds a value of one to an eight-bit horizontal center position variable HC. If the command is a decrement command, step 914 is executed which subtracts a value of one from the variable HC. The steps 912 and 914 both transfer control to a step 916.

The step 916 determines if the value held by the variable HC is less than the quantity $-ZR/2$. If it is, then the left side of the magnified image may include portions of the horizontal blanking interval. To prevent this, step 918 is executed which assigns the value $ZR/2$ to the variable HC. The next step executed, 920, determines if the value held in the variable HC is greater than $256-ZR/2$. If so, the left side of the image may include portions of the horizontal blanking interval. To prevent this, the step 922 is executed which assigns the value $256-ZR/2$ to the variable HC.

The next step, 924, multiplies the value held in HC by 64 and stores the result in a variable HC1. This operation converts the eight-bit HC value into an equivalent 14-bit value Step 924 also generates a horizontal starting position value from the value HC1 and stores the generated value in a variable HPOS. The algorithm for this conversion is given in the equation (4) set forth above. At step 926, the value HPOS is applied by the microprocessor 712 to the latch 716. The final step, 928, of the routine returns control to the program which invoked the horizontal position routine.

The vertical position routine is the same as the horizontal position routine shown in FIG. 9 except that the variables VC, VC1 and VPOS replace the variables HC, HC1 and HPOS, the step 924 multiplies VC by 16 instead of 64, and equation (5) is used instead of equation (4) to convert the value held in VC1 to a value to be stored in VPOS.

Figure 10:
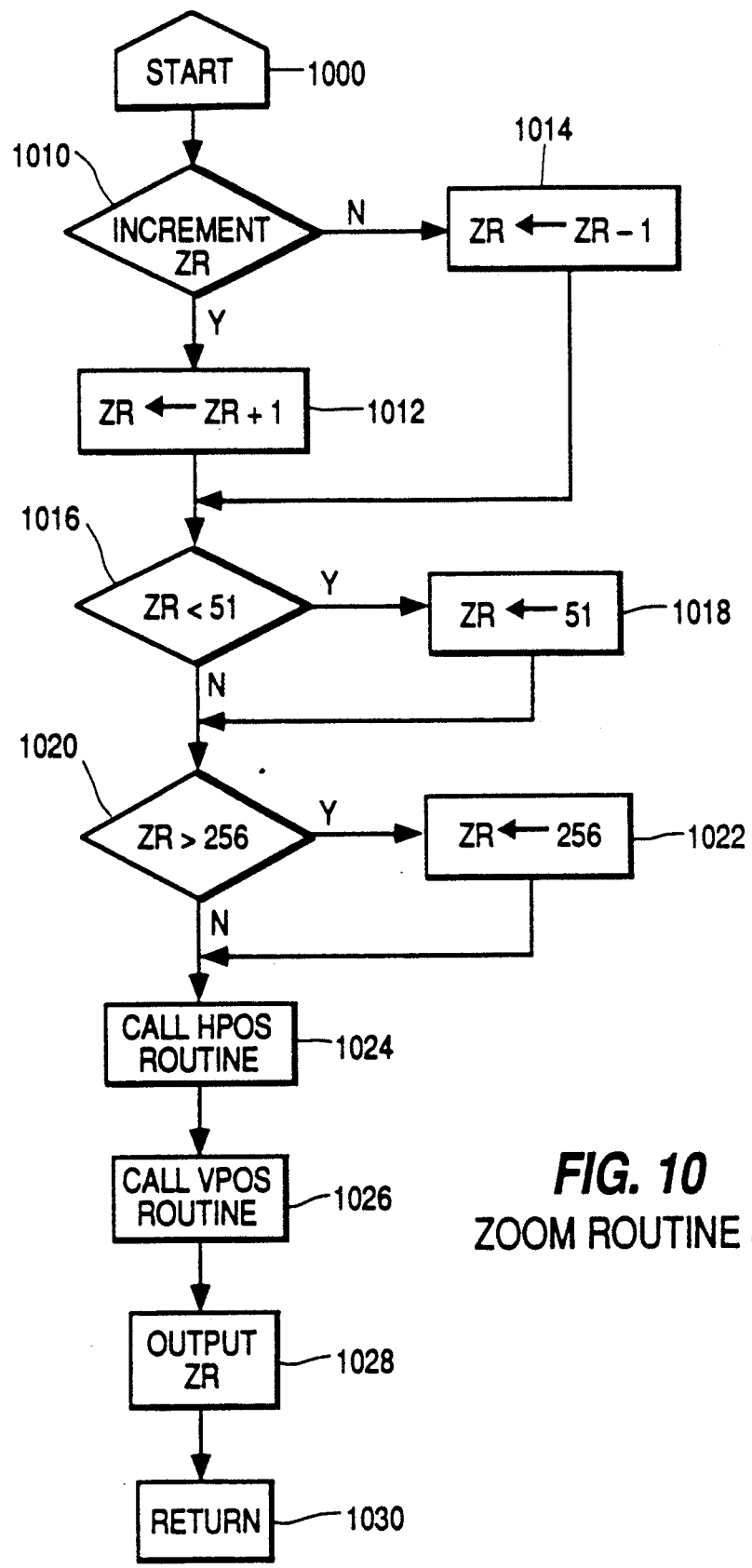

FIG. 10 is a flow-chart diagram of a zoom routine suitable for use in this embodiment of the invention. The zoom routine starts at step 1000 which accepts the command from the interface 710. Step 1010 determines if the command requests that the signal ZR be incremented (to reduce the magnification factor) or be decremented (to increase the magnification factor). If ZR is to be incremented, step 1012 is executed, otherwise step 1014 is executed. The next step in the routine, 1016 determines if the value held in the variable ER is less than 51. This value corresponds to a magnification factor of five-to-one, an arbitrarily established maximum for this embodiment of the invention. If ZR is less than 51, a step 1018 sets ZR to 51. Step 1020 determines if the incremented value held in the variable ZR is greater than 256. This value corresponds to the minimum magnification factor, one-to-one. Step 1022 limits the value held in ZR to 256. After the value held in ZR has been updated, the horizontal position routine is invoked at step 1024 and the vertical position routine is invoked at step 1026 to recalculate the current values of HC and VC using the new value of ZR. These recalculated values for HC and VC ensure that image blanking intervals are not displayed as part of the magnified image. Step 1028 writes the calculated value of ZR HPOS and VPOS into the register 714, 716 and 718, and step 1030 returns control to the main program.

While this invention has been described in terms of three exemplary embodiments, it is contemplated that it may be practiced as outlined above with modifications within the spirit and scope of the appended claims.

CAV SOFTWARE FOR 1989 V2.0 COPYRIGHT THOMSON CONSUMER ELECTRONICS 1988
PIP CODE SECTION

```
246                              CODE     SECTION
247
248        048A              PIPPOS_INIT   EQU       (256*HORRGHT)+VERBOT
249
250                          ;;;;;;;;;;;;;;;;;;;;;;;;;;;;;;;;;;;;;;;;;;;;;;;;;;;;;;;;;;;;;;;;
251                          ;       HORCHK AND VERCHK ENTER WITH VALUE IN A, IT IS LIMITED, AND THEN
252                          ;       STORED IN THE CORRECT PIP POSITION
253                          ;
254   E4FA  7B 40 D0         VERCHK:   TIM    ZOOMED,PIPFLG2
255   E4FD  27 10                      BEQ    ?NOZOOM
256   E4FF  D6 CC                      LDAB   ZOOM
257   E501  54                         LSRB
258   E502  10                         SBA
259   E503  24 01                      BCC    ?ZOK1
260   E505  4F                         CLRA
261   E506  1B               ?ZOK1:    ABA
262   E507  1B                         ABA
263   E508  24 02                      BCC    ?ZOK2
264   E50A  86 FF                      LDAA   #0FFH
265   E50C  10               ?ZOK2:    SBA
266   E50D  20 0C                      BRA    ?OK2
267                          ;
268   E50F  81 06            ?NOZOOM:CMPA    #06H
269   E511  22 02                      BHI    ?OK1
270   E513  86 06                      LDAA   #06H
271   E515  81 A0            ?OK1:     CMPA   #0A0H
272   E517  25 02                      BLO    ?OK2
273   E519  86 A0                      LDAA   #0A0H
274   E51B  97 C5            ?OK2:     STAA   VERPOS
275   E51D  39                         RTS
276                          ;
277   E51E  7B 40 D0         HORCHK:   TIM    ZOOMED,PIPFLG2
278   E521  27 10                      BEQ    ?NOZOOM
279   E523  D6 CC                      LDAB   ZOOM
280   E525  54                         LSRB
281   E526  10                         SBA
282   E527  24 01                      BCC    ?ZOK1
283   E529  4F                         CLRA
284   E52A  1B               ?ZOK1:    ABA
285   E52B  1B                         ABA
286   E52C  24 02                      BCC    ?ZOK2
287   E52E  86 FF                      LDAA   #0FFH
288   E530  10               ?ZOK2:    SBA
289   E531  20 0C                      BRA    ?OK2
290                          ;
291   E533  81 E4            ?NOZOOM:CMPA    #0E4H
292   E535  25 02                      BLO    ?OK1
293   E537  86 E4                      LDAA   #0E4H
294   E539  81 0C            ?OK1:     CMPA   #0CH
295   E53B  22 02                      BHI    ?OK2
296   E53D  86 0C                      LDAA   #0CH
297   E53F  97 C4            ?OK2:     STAA   HORPOS
298   E541  39                         RTS
299                          ;;;;;;;;;;;;;;;;;;;;;;;;;;;;;;;;;;;;;;
300   E541                   RIGHT_ARROW:
301   E542  96 C4                      LDAA   HORPOS
302   E544  C6 02                      LDAB   #2
303   E546  7B 80 5B                   TIM    PIPON,PIPFLG           ;IF PIP IS ON
304   E549  26 41                      BNE    HARROW_END             ;THEN GO EXECUTE A MOVE
305   E54B  7B 10 5D                   TIM    KEYRLS,PARSFLG
306   E54E  27 1E                      BEQ    PIP_COM_END0
```

| Line | Addr | Bytes | Label | Op | Operand | Comment |
|---|---|---|---|---|---|---|
| 307 | E550 | 7B 08 00 | | TIM | MULTION,PIPFLG2 | |
| 308 | E553 | 27 07 | | BEQ | ?NOMULT | ;IF IN MULTIPIX MODE |
| 309 | E555 | 86 0A | | LDAA | #CPIPMGRAB | |
| 310 | E557 | BD E9 C7 | | JSR | CPIPCOM | ;THEN REPEAT CURRENT COMMAND |
| 311 | E55A | 20 12 | | BRA | PIP_COM_END0 | |
| 312 | | | ; | | | (GRAB A FRAME) |
| 313 | E55C | 7B 10 00 | ?NOMULT:TIM | | DVEON,PIPFLG2 | |
| 314 | E55F | 27 00 | | BEQ | PIP_COM_END0 | ;IF WE ARE IN DVE MODE |
| 315 | E561 | 96 CB | | LDAA | SOLAR | |
| 316 | E563 | 16 | | TAB | | |
| 317 | E564 | 48 | | ASLA | | ;INCREASE LEVEL OF SOLARIZE |
| 318 | E564 | | SOLAREND: | | | |
| 319 | E565 | C4 40 | | ANDB | #40H | ;GET STATE OF VIDEO INVERT IN B |
| 320 | E567 | 8A 20 | | ORAA | #20H | ;ALWAYS LET ONE BIT OF VIDEO THROUGH |
| 321 | E569 | 84 BF | | ANDA | #0FFH-40H | |
| 322 | E56B | 1B | | ABA | | |
| 323 | E56C | 97 CB | | STAA | SOLAR | ;STORE NEW SOLARIZE MASK |
| 324 | E56C | | PIP_COM_END0: | | | |
| 325 | E56E | 7E E7 77 | | JMP | PIP_COM_END | |
| 326 | | | ; | | | |
| 327 | E56E | | LEFT_ARROW: | | | |
| 328 | E571 | 96 C4 | | LDAA | HORPOS | |
| 329 | E573 | C6 FE | | LDAB | #-2 | |
| 330 | E575 | 7B 80 5B | | TIM | PIPON,PIPFLG | |
| 331 | E578 | 26 12 | | BNE | HARROW_END | |
| 332 | E57A | 7B 10 5D | | TIM | KEYRLS,PARSFLG | |
| 333 | E57D | 27 EF | | BEQ | PIP_COM_END0 | |
| 334 | E57F | 7B 10 00 | | TIM | DVEON,PIPFLG2 | |
| 335 | E582 | 27 EA | | BEQ | PIP_COM_END0 | |
| 336 | E584 | 96 CB | | LDAA | SOLAR | |
| 337 | E586 | 16 | | TAB | | |
| 338 | E587 | 44 | | LSRA | | |
| 339 | E588 | 8A 40 | | ORAA | #40H | |
| 340 | E58A | 20 D9 | | BRA | SOLAREND | |
| 341 | | | ; | | | |
| 342 | E58A | | HARROW_END: | | | |
| 343 | E58C | 8D 40 | | BSR | ARROSUB | |
| 344 | E58E | 8D 8E | | BSR | HORCHK | |
| 345 | E590 | 20 79 | | BRA | ARROW_END | |
| 346 | | | ; | | | |
| 347 | E590 | | UP_ARROW: | | | |
| 348 | E592 | 96 C5 | | LDAA | VERPOS | |
| 349 | E594 | C6 FE | | LDAB | #-2 | |
| 350 | E596 | 20 04 | | BRA | VARROW_END | |
| 351 | | | ; | | | |
| 352 | E596 | | DOWN_ARROW: | | | |
| 353 | E598 | 96 C5 | | LDAA | VERPOS | |
| 354 | E59A | C6 02 | | LDAB | #2 | |
| 355 | E59A | | VARROW_END: | | | |
| 356 | E59C | 7B 18 D0 | | TIM | DVEON+MULTION,PIPFLG2 | |
| 357 | E59F | 26 07 | | BNE | ?STROBE | |
| 358 | E5A1 | 8D 2B | | BSR | ARROSUB | |
| 359 | E5A3 | BD E4 FA | | JSR | VERCHK | |
| 360 | E5A6 | 20 63 | | BRA | ARROW_END | |
| 361 | | | ; | | | |
| 362 | E5A8 | 7B 10 5D | ?STROBE:TIM | | KEYRLS,PARSFLG | |
| 363 | E5AB | 27 1E | | BEQ | ?STROB9 | |
| 364 | E5AD | 86 52 | | LDAA | #SPEEDOSD | |
| 365 | E5AF | BD C6 07 | | JSR | SENDOSD | ;SEND COMMAND TO DISPLAY STROBE SPEED |
| 366 | E5B2 | 50 | | NEGB | | |
| 367 | E5B3 | 57 | | ASRB | | ;CHANGE B TO +-1 |
| 368 | E5B4 | DB CA | | ADDB | PIPSPEED | |
| 369 | E5B6 | 2A 01 | | BPL | ?OK1 | |
| 370 | E5B8 | 5F | | CLRB | | |
| 371 | E5B9 | C1 09 | ?OK1: | CMPB | #PIPSPEED_TABLEEND-PIPSPEED_TABLE | |
| 372 | E5BB | 2F 02 | | BLE | ?OK2 | |

```
373   E5BD   C6 09              LDAB    #PIPSPEED_TABLEEND-PIPSPEED_TABLE
374   E5BF   96 CA       ?OK2:  LDAA    PIPSPEED
375   E5C1   D7 CA              STAB    PIPSPEED
376   E5C3   4D                 TSTA
377   E5C4   26 05              BNE     ?STROB9           ;IF STROBE WAS FROZEN
378   E5C6   96 C6              LDAA    CPIPSTAT
379   E5C8   BD E9 C7           JSR     CPIPCOM           ;THEN START CPIP UP AGAIN
380   E5CB   7E CE AA    ?STROB9:JMP    PARSEND
381                             ;
382   E5CE   7B 40 D0    ARROSUB:TIM    ZOOMED,PIPFLG2
383   E5D1   26 05              BNE     ?ZOOM
384   E5D3   7B 84 5B           TIM     PIPON+FROZEN,PIPFLG
385   E5D6   27 11              BEQ     ?SKIP             ;IF PIP PIX IS DISPLAYED, OR ZOOM IS ON
386   E5D8   7B 10 5D    ?ZOOM: TIM     KEYRLS,PARSFLG    ;| IF THIS IS NOT THE FIRST ARROW COMMAND
387   E5DB   26 08              BNE     ?DOIT
388   E5DD   58                 ASLB                      ;| | DOUBLE THE AMOUNT TO MOVE
389   E5DE   7D 00 5D           TST     PARSFLG           ;| | IF THIS IS NOT THE 5TH ARROW CMD
390   E5E1   2B 06              BMI     ?SKIP             ;| |   THEN SKIP THE MOVE
391   E5E3   7B 20 57           TIM     CPIPSYS,STAWD1    ;| | IF THIS IS A CPIP SET
392   E5E6   26 01              BNE     ?SKIP             ;| |   THEN SKIP THE MOVE
393   E5E8   1B          ?DOIT: ABA                       ;| ENDIF(CHANGE POSITION FOR THIS ARROW)
394   E5E9   39          ?SKIP: RTS                       ;ENDIF
395                             ;;;;;;;;;;;;;;;;;;;;;;;;;;;;;;;;;;;;;;;;;;;;;;;;;;;;;;;;;;;;;;;;;
396   E5E9               MOVE_KEY:
397   E5EA   7B 84 5B           TIM     PIPON+FROZEN,PIPFLG  ;IF PIP IS ON
398   E5ED   27 26              BEQ     PIP_COM_END1
399   E5EF   96 C5              LDAA    VERPOS
400   E5F1   D6 C4              LDAB    HORPOS            ;| GET CURRENT PIX POSITION
401   E5F3   81 52              CMPA    #52H
402   E5F5   22 04              BHI     ?RIGHT
403   E5F7   86 1C              LDAA    #HORLEFT          ;| IF WE WERE IN TOP HALF OF SCREEN
404   E5F9   20 02              BRA     ?HOREND           ;| THEN SET TO LEFT DEFAULT POSITION
405                             ;
406   E5FB   86 D4       ?RIGHT:LDAA    #HORRGHT          ;| ELSE SET TO RIGHT DEFAULT
407   E5FD   97 C4       ?HOREND:STAA   HORPOS            ;| STORE NEW HOR. POSITION
408   E5FF   C1 5A              CMPB    #5AH
409   E601   22 04              BHI     ?TOP              ;| IF WE WERE IN LEFT HALF OF SCREEN
410   E603   86 8A              LDAA    #VERBOT           ;| THEN SET TO BOTTOM DEFAULT POSITION
411   E605   20 02              BRA     ?VEREND
412                             ;
413   E607   86 1A       ?TOP:  LDAA    #VERTOP           ;| ELSE SET TO TOP DEFAULT POSITION
414   E609   97 C5       ?VEREND:STAA   VERPOS            ;| STORE NEW VERT. POSITION
415   E609               ARROW_END:
416   E60B   7B 80 5B           TIM     PIPON,PIPFLG
417   E60E   27 05              BEQ     ?NOPIP
418   E610   86 02              LDAA    #CPIPMOVST        ;RESET CPIP'S READ ADDR
419   E612   BD E9 C7           JSR     CPIPCOM           ;START UP TASK TO SEND IT
420   E612               ?NOPIP:
421   E612               PIP_COM_END1:
422   E615   20 56              BRA     PIP_COM_END2      ;ENDIF
423                             ;;;;;;;;;;;;;;;;;;;;;;;;;;;;;;;;;;;;;;;;;;;;;;;;;;;;;;;;;;;;;;;;;
424   E615               FREEZE_KEY:
425   E617   7B 80 47           TIM     DEVON,STATUS
426   E61A   27 51              BEQ     PIP_COM_END2
427   E61C   75 04 5B           EIM     FROZEN,PIPFLG     ;CHANGE FROZEN STATUS OF MODULE
428   E61F   7B 40 57           TIM     DPIPSYS,STAWD1
429   E622   26 34              BNE     ?DPIP             ;IF THIS IS A CPIP SET
430   E624   7B 10 D0           TIM     DVEON,PIPFLG2
431   E627   26 44              BNE     PIP_COM_END2      ;| IF MODULE IS IN TVGUIDE OR DVE
432   E629   7B 40 5B           TIM     TVGON,PIPFLG      ;| THEN EXIT
433   E62C   26 3F              BNE     PIP_COM_END2
434   E62E   7B 04 5B           TIM     FROZEN,PIPFLG
435   E631   27 13              BEQ     ?MOVE             ;| IF VIDEO IS NOW FROZEN
436   E633   7B 08 D0           TIM     MULTION,PIPFLG2
437   E636   26 35              BNE     PIP_COM_END2      ;| | IF IN MULTIPIX, THEN EXIT
438   E638   86 12              LDAA    #CPIPSMFRZ        ;| | SET UP TO FREEZE SMALL PIX
```

```
439  E63A  7B 80 5B           TIM     PIPON,PIPFLG
440  E63D  26 02              BNE     ?PIPFRZ           ;| | IF PIP IS NOT ON
441  E63F  86 14              LDAA    #CPIPBIGFRZ       ;| | THEN FREEZE BIG PIX
442  E641  BD E9 C7  ?PIPFRZ: JSR     CPIPCOM
443  E644  20 27              BRA     PIP_COM_END2
444                     ;                              ;| ELSE (VIDEO IS NOW MOVING)
445  E646  86 03       ?MOVE: LDAA   #CPIP_SM_UNFRZ
446  E648  7B 80 5B           TIM     PIPON,PIPFLG     ;| | IF PIP IS ON, THEN UNFREEZE THE SMALL PIX
447  E64B  26 F4              BNE     ?PIPFRZ
448  E64D  96 C6              LDAA    CPIPSTAT
449  E64F  7B 08 D0           TIM     MULTION,PIPFLG2  ;| | IF MULTIPIX IS ON, THEN UNFREEZE MPIX
450  E652  26 ED              BNE     ?PIPFRZ          ;|
451  E654  86 01              LDAA    #CPIPRES         ;| | ELSE RESET THE WHOLE MODULE
452  E656  20 E9              BRA     ?PIPFRZ          ;| ENDIF
453                     ;                              ;ELSE
454  E658  7B 80 5B    ?DPIP: TIM     PIPON,PIPFLG
455  E65B  26 10              BNE     PIP_COM_END2     ;| IF PIP IS NOT ON
456  E65D  7D 00 84           TST     CURDEV
457  E660  26 05              BNE     ?NOTTV           ;| | IF TV IS CURDEV
458  E662  BD D6 64           JSR     TVSWIT           ;| | | SWITCH TO TV
459  E665  20 03              BRA     ?TV
460                     ;                              ;| | ELSE
461  E667  BD D7 0C    ?NOTTV: JSR    DEVSWIT          ;| | | SWITCH THIS DEVICE
462              ?TV:                                  ;| | ENDIF
463  E66A  72 06 18           OIM     SELBITS,PORT7    ;| | MAKE SURE MODULE FREEZES THE BIG PIX
464              PIP_COM_END2:                         ;| ENDIF
465  E66D  20 2C              BRA     PIP_COM_END3     ;ENDIF
466                     ;;;;;;;;;;;;;;;;;;;;;;;;;;;;;;;;;;;;;;;;;;;;;;;;;;;;;;;;;
467  E66F  86 FF       IN_KEY: LDAA   #-1              ;SET UP TO DECREMENT SIZE
468  E671  20 02              BRA     ZOOMIT           ;CHANGE SIZE
469                     ;;;;;;;;;;;;;;;;;;;;;;;;;;;;;;;;;;;;;;;;;;;;;;;;;;;;;;;;;
470  E673  86 01       OUT_KEY:LDAA   #1               ;SET UP TO INCREMENT SIZE
471              ;       BRA     ZOOMIT                ;CHANGE SIZE IF WE SHOULD
472                     ;;;;;;;;;;;;;;;;;;;;;;;;;;;;;;;
473                     ;
474                     ;   ZOOMIT ADDS A TO PIPMULTI IF MPIX OR PIP MODE
475                     ;           ADDS A TO ZOOM IF IN NORMAL OR ZOOM MODE
476                     ;   ALSO CHECKS FOR LIMITS
477                     ;   Z-FLAG SET IF WE DID OR DO ANYTHING
478                     ;
479  E675  7B 10 5D    ZOOMIT: TIM    KEYRLS,PARSFLG
480  E678  27 21              BEQ     PIP_COM_END3     ;IF THIS IS THE FIRST COMMAND
481  E67A  7B 08 D0           TIM     MULTION,PIPFLG2
482  E67D  26 05              BNE     ?SMSIZE
483  E67F  7B 80 5B           TIM     PIPON,PIPFLG
484  E682  27 19              BEQ     ZOOMPIX          ;| IF PIP OR MPIX IS ON
485  E684  9B C8       ?SMSIZE:ADDA   PIPMULTI
486  E686  2A 01              BPL     ?OK1
487  E688  4F                 CLRA
488  E689  81 05       ?OK1:  CMPA    #5
489  E68B  2D 02              BLT     ?OK2
490  E68D  86 04              LDAA    #4
491  E68F  97 C8       ?OK2:  STAA    PIPMULTI         ;| | SET PIP MULTI TO NEW SIZE VALUE
492  E691  7B 80 5B           TIM     PIPON,PIPFLG
493  E694  27 61              BEQ     MPIXEND          ;| | IF WE SET MPIX SIZE, THEN RESTART MPIX
494  E696  86 07              LDAA    #PIPZOOMST       ;| | ELSE RESTART PIP
495  E698  BD E9 C7           JSR     CPIPCOM
496  E69B              PIP_COM_END3:
497  E69B  20 68              BRA     PIP_COM_END4
498                     ;                              ;| ELSE
499  E69D  8D 1B       ZOOMPIX:BSR    ZOOMSET
500  E69F  4C                 INCA
501  E6A0  26 08              BNE     ?ZOOM            ;| | IF ZOOM IS 1:1
502  E6A2  71 BF D0           AIM     OFFH.XOR.ZOOMED,PIPFLG2
503  E6A5  BD E9 BD           JSR     PIPSTART         ;| | | RESTART MODULE
504  E6A8  20 5E              BRA     PIP_COM_END4
```

```
505                         ;                               ;| | ELSE
506  E6AA  72 40 00    ?ZOOM:  OIM    ZOOMED,PIPFLG2
507  E6AD  86 16               LDAA   #CPIPZOOM           ;| | | SHOW ZOOMED VIDEO
508  E6AF  BD E9 C7            JSR    CPIPCOM
509  E6B2  86 53               LDAA   #ZOOMOSD
510  E6B4  BD C6 07            JSR    SENDOSD             ;| | | SEND ZOOM OSD
511  E6B7  7E CE AA            JMP    PARSEND             ;| | | SEND KEY RELEASE TO TV
512                                                       ;ENDIF ENDIF ENDIF
513                         ;
514  E6BA  D6 CC       ZOOMSET:LDAB   ZOOM
515  E6BC  7B 40 00            TIM    ZOOMED,PIPFLG2  ;| | IF ZOOM IS NEW
516  E6BF  26 08               BNE    ?NEWZM
517  E6C1  C6 80               LDAB   #80H
518  E6C3  D7 C5               STAB   VERPOS
519  E6C5  D7 C4               STAB   HORPOS              ;| | THEN SET POSITION TO CENTER
520  E6C7  C6 FF               LDAB   #0FFH               ;| | AND START AT 1:1
521  E6C9  1B          ?NEWZM: ABA
522  E6CA  26 01               BNE    ?OK3
523  E6CC  4A                  DECA                20
524  E6CD  81 19       ?OK3:   CMPA   #25
525  E6CF  22 02               BHI    ?OK4
526  E6D1  86 19               LDAA   #25
527  E6D3  97 CC       ?OK4:   STAA   ZOOM                ;| | STORE NEW VALUE OF ZOOM
528  E6D5  39                  RTS
529                         ;;;;;;;;;;;;;;;;;;;;;;;;;;;;;;;;;;;;;;;;;;;;;;;;;;;;;;;;;;;;;;;
530  E6D5-               MULTI_KEY:
1707                        ;;
1708                        ;WRT_OFFSET:
1709                        ;       DB      0,0,0,0
1710                        ;       DB      0,0,0,0
1711                        ;       DB      0,0,0,0
1712                        ;       DB      0,0,0,0
1713                        ;;;;;;;;;;;;;;;;;;;;;;;;;;;;;;;;;;;;;;;;;;;;;;;;;;;;;;;;;;;;;;;
1714                        ;
1715                        ;   DVEOUTMOD:   ROUTINE TO SET VIDEO MASKS FOR DVE
1716                        ;
1717                        ;;;;;;;;;;;;;;;;;;;;;;;;;;;;;;;;;;;;;;;;;;;;;;;;;;;;;;;;;;;;;;;
1718  EBE2              DVEOUTMOD:
1719  EBE3  FC EB 58            LDD    FFF_OUTMOD
1720  EBE6  DD 8C               STD    DATA_BUFFER
1721  EBE8  FC EB 5A            LDD    FFF_OUTMOD+2
1722  EBEB  DD 8E               STD    DATA_BUFFER+2   ;COPY DEFAULT FULL FIELD EFFECTS
1723  EBED  96 CB               LDAA   SOLAR
1724  EBEF  16                  TAB
1725  EBF0  94 8D               ANDA   DATA_BUFFER+1
1726  EBF2  97 8D               STAA   DATA_BUFFER+1       ;SET C MASK AND INVERT
1727  EBF4  D4 8F               ANDB   DATA_BUFFER+3
1728  EBF6  D7 8F               STAB   DATA_BUFFER+3       ;SET Y MASK AND INVERT
1729  EBF8  85 40               BITA   #40H
1730  EBFA  26 03               BNE    ?POSVID             ;IF VIDEO IS INVERTED
1731  EBFC  75 3F 8E            EIM    #3FH,DATA_BUFFER+2
1732  EBFF  BD ED 60    ?POSVID:JSR    GETSPEED
1733  EC02  86 0A               LDAA   #CPIPDVE+1          ;DEFUALT TO LOOP FOR DVE
1734  EC04  5A                  DECB
1735  EC05  27 11               BEQ    ?FLYING             ;IF STROBE IS ON
1736  EC07  36                  PSHA
1737  EC08  37                  PSHB
1738  EC09  CE EB 84            LDX    #FRZ_INPTIM
1739  EC0C  BD E9 41            JSR    SET_INP_TIM         ;THEN STOP THE WRITES
1740  EC0F  33                  PULB
1741  EC10  32                  PULA
1742  EC11  C1 FE               CMPB   #0FEH
1743  EC13  26 03               BNE    ?FLYING             ;IF DVE IS FROZEN
1744  EC15  86 09               LDAA   #CPIPDVE            ;THEN DON'T GRAB ANY MORE FRAMES
1745  EC17  5F                  CLRB
1746  EC18  D7 C2       ?FLYING:STAB   NEXT_FIELD          ;SET SPEED FOR STROBE
```

```
1747   EC1A   97 C6                STAA    CPIPSTAT
1748   EC1C   39                   RTS
1749                               ;;;;;;;;;;;;;;;;;;;;;;;;;;;;;;;;;;;;;;;;;;;;;;;;;;;;;;;;;;;;;;;;;;
1750                               ;
1751                               ;   ZOOMADR:       SET READ ADDR FOR ZOOM
1752                               ;
1753   EC1C                        ;;;;;;;;;;;;;;;;;;;;;;;;;;;;;;;;;;;;;;;;;;;;;;;;;;;;;;;;;;;;;;;;;;
1754   EC1D   CE EC 73    ZOOMADR: LDX     #ZOOM_TABLE
1755   EC20   8D 46                BSR     PIPKEYS         ;EXECUTE ZOOM OR PAN COMMANDS
1756   EC22   96 C4                LDAA    HORPOS
1757   EC24   D6 CC                LDAB    ZOOM
1758   EC26   54                   LSRB
1759   EC27   10                   SBA                     ;CLACULATE LEFT EDGE POSITION
1760   EC28   36                   PSHA
1761   EC29   96 C5                LDAA    VERPOS
1762   EC2B   10                   SBA                     ;CALCULATE TOP POSITION
1763   EC2C   33                   PULB
1764   EC2D   54                   LSRB
1765   EC2E   54                   LSRB
1766   EC2F   54                   LSRB                    ;CHANGE HORIZONTAL POSITION TO BLOCK COUNT
1767   EC30   BD ED 7F             JSR     VRAM_ADDR_CALC
1768   EC33   D6 CC                LDAB    ZOOM
1769   EC35   D7 C0                STAB    DATA_BUFFER+4   ;PUT ZOOM VALUE IN BUFFER
1770   EC37   7C 00 C6             INC     CPIPSTAT        ;EXECUTE THIS COMMAND NEXT TIME TOO
1771   EC3A   39                   RTS
1772                               ;
1773   EC3B   FC EB 48    ZOOMTIM: LDD    FILL_OUTTIM
1774   EC3E   DD 8C                STD     DATA_BUFFER
1775   EC40   FC EB 4A             LDD     FILL_OUTTIM+2
1776   EC43   DD 8E                STD     DATA_BUFFER+2
1777   EC45   FC EB 4C             LDD     FILL_OUTTIM+4
1778   EC48   97 C0                STAA    DATA_BUFFER+4
1779   EC4A   96 C4                LDAA    HORPOS
1780   EC4C   84 07                ANDA    #07H            ;GET LSB'S OF HORIZONTAL POSITION
1781   EC4E   48                   ASLA
1782   EC4F   48                   ASLA                    ;CONVERT FROM 200uS TO 50uS STEPS
1783   EC50   1B                   ABA                     ;ADD IN DEFAULT VALUE
1784   EC51   D6 CC                LDAB    ZOOM
1785   EC53   58                   ASLB
1786   EC54   1B                   ABA                     ;ADD IN SKEW FOR ZOOM VALUE
1787   EC55   97 C1                STAA    DATA_BUFFER+5
1788   EC57   39                   RTS
1789                               ;
1790   EC57                        ZOOMING_IN:
1791   EC58   86 FF                LDAA    #-1
1792   EC5A   20 02                BRA     ZOOMING_END
1793                               ;
1794   EC5A                        ZOOMING_OUT:
1795   EC5C   86 01                LDAA    #1
1796   EC5C                        ZOOMING_END:
1797   EC5E   BD E6 8A             JSR     ZOOMSET
1798   EC61   86 53                LDAA    #ZOOMOSD
1799   EC63   BD C6 07             JSR     SENDOSD
1800   EC66   20 36                BRA     PIPKEYS_END
1801                               ;
1802   EC68   7D 00 5D    PIPKEYS: TST    PARSFLG          ;IF WE HAVE GOTTEN FIVE OF THE SAME CMD
1803   EC6B   2B 05                BMI     ?SKIP
1804   EC6D   96 85                LDAA    LASTCOM
1805   EC6F   BD D2 90             JSR     GENPARSE        ;THEN EXECUTE AN ARROW COMMAND IF NEEDED
1806   EC72   39         ?SKIP:    RTS
1807                               ;
1808   EC72                        ZOOM_TABLE:
1809   EC73   AA                   DB      CZOOMIN
1810   EC74   EC58                 DW      ZOOMING_IN
1811   EC76   AE                   DB      CZOOMOUT
1812   EC77   EC5C                 DW      ZOOMING_OUT
```

| 1813 | EC77 |  | CPIPMOVTAB: |  |  |
|---|---|---|---|---|---|
| 1814 | EC79 | A6 |  | DB | CPIPUP |
| 1815 | EC7A | EC86 |  | DW | ?UP |
| 1816 | EC7C | A7 |  | DB | CPIPDN |
| 1817 | EC7D | EC8A |  | DW | ?DOWN |
| 1818 | EC7F | A8 |  | DB | CPIPRT |
| 1819 | EC80 | EC97 |  | DW | ?RIGHT |
| 1820 | EC82 | A9 |  | DB | CPIPLF |
| 1821 | EC83 | EC93 |  | DW | ?LEFT |
| 1822 | EC85 | 00 |  | DB | 0 |
| 1823 |  |  | ; |  |  |
| 1824 | EC86 | 86 FF | ?UP: | LDAA | #-1 |
| 1825 | EC88 | 20 02 |  | BRA | ?VEREND |
| 1826 |  |  | ; |  |  |
| 1827 | EC8A | 86 01 | ?DOWN: | LDAA | #1 |
| 1828 | EC8C | 9B C5 | ?VEREND:ADDA | | VERPOS |
| 1829 | EC8E | BD E4 FA |  | JSR | VERCHK |
| 1830 | EC91 | 20 0B |  | BRA | PIPKEYS_END |
| 1831 |  |  | ; |  |  |
| 1832 | EC93 | 86 FF | ?LEFT: | LDAA | #-1 |
| 1833 | EC95 | 20 02 |  | BRA | ?HOREND |
| 1834 |  |  | ; |  |  |
| 1835 | EC97 | 86 01 | ?RIGHT: | LDAA | #1 |
| 1836 | EC99 | 9B C4 | ?HOREND:ADDA | | HORPOS |
| 1837 | EC9B | BD E5 1E |  | JSR | HORCHK |
| 1838 | EC9B |  | PIPKEYS_END: |  |  |
| 1839 | EC9E | C6 00 |  | LDAB | #0 ;SET TO UPDATE LOCATION NEXT FIELD |
| 1840 | ECA0 | D7 C2 |  | STAB | NEXT_FIELD |
| 1841 | ECA2 | 39 |  | RTS |  |

1842 ;;;;;;;;;;;;;;;;;;;;;;;;;;;;;;;;;;;;;;;;;;;;;;;;;;;;;;;;;;;;;;;;;;
1843 ;
1844 ;     CPIPLOC:    ROUTINE TO SET READ ADDR FOR CPIP
1845 ;                 THIS DETERMINES THE LOCATION OF THE SMALL PIX
1846 ;     PRESERVE:
1847 ;
1848 ;;;;;;;;;;;;;;;;;;;;;;;;;;;;;;;;;;;;;;;;;;;;;;;;;;;;;;;;;;;;;;;;;;
1849 ;HORIZONTAL POSITION OF 12 --> READ START =31
1850 ;                       228 -->            =12 APPROX.
1851 ; H READ = 1.5*(356-HORPOS)/16   11-31
1852 ;VERTICAL POSITION OF   6 --> READ START =254
1853 ;                       160 -->            =54 APPROX.
1854 ; V READ = 1.25*(209-VERPOS) 61-254

| 1855 | ECA2 |  | CPIPLOC: |  |  |
|---|---|---|---|---|---|
| 1856 | ECA3 | 7C 00 C6 |  | INC | CPIPSTAT ;SET TO EXECUTE PIP POSITION NEXT TIME TOO |
| 1857 | ECA6 | 86 09 |  | LDAA | #9 |
| 1858 | ECA8 | 97 C2 |  | STAA | NEXT_FIELD ;SET TO CHECK POSITION AGAIN IN 9 FIELDS |
| 1859 | ECAA | CE EC 79 |  | LDX | #CPIPMOVTAB |
| 1860 | ECAD | 8D B9 |  | BSR | PIPKEYS ;EXECUTE MOVE COMMAND IF WE SHOULD |
| 1861 | ECAF | BD ED 63 |  | JSR | PIXDATA_GET ;GET POINTER TO CURRENT PIX SIZE INFO |
| 1862 | ECB2 | FC EB 48 |  | LDD | PIP_OUTTIM |
| 1863 | ECB5 | DD BC |  | STD | DATA_BUFFER |
| 1864 | ECB7 | FC EB 4A |  | LDD | PIP_OUTTIM+2 |
| 1865 | ECBA | DD BE |  | STD | DATA_BUFFER+2 |
| 1866 | ECBC | FC EB 4C |  | LDD | PIP_OUTTIM+4 |
| 1867 | ECBF | DD C0 |  | STD | DATA_BUFFER+4 |

1868 ; CALCULATE READ POSITION START IN 50nS COUNTS
1869 ; 228-HORPOS IS TO MAKE A HIGH HORPOS INTO THE RIGHT SIDE OF SCREEN
1870 ; 19(32) IS AN OFFSET TO START WITH FOR A 3x3 PIX
1871 ; HORSIZ-HORSIZ 3x3 IS IN PIXELS (100nS) AND CENTERS TO ZOOM COMMANDS

| 1872 | ECC1 | 96 C4 |  | LDAA | HORPOS |
|---|---|---|---|---|---|
| 1873 | ECC3 | 40 |  | NEGA | ;A= -HORPOS |
| 1874 | ECC4 | C6 03 |  | LDAB | #3 |
| 1875 | ECC6 | 3D |  | MUL | ;D= -3*HORPOS |
| 1876 | ECC7 | C3 04 6C |  | ADDD | #(3*228)+(19*32)-160 ;D= 3(228-HORPOS)-19(32)-HOR SIZ OF 3x3 |
| 1877 | ECCA | 36 |  | PSHA | ;SAVE HIGH ORDER BYTE |

What is claimed is:

1. In a video signal processing system including means for producing a magnified image representing a portion of an active video part of a source image, means for selecting the portion of the source image to be magnified comprising:
   first viewer control means for establishing a center point of the selected portion in at least a first coordinate direction;
   second viewer control means for adjusting a magnification factor for scaling the selected portion to produce said magnified image;
   means responsive to adjusted magnification factors for generating limit values; and
   means, responsive to said limit values for adjusting the position of said center point to prevent display of portions as said source image outside of said active video part.

2. In a system for receiving a television signal having an active video portion and a non active video portion, apparatus comprising:
   means for processing said television signal to develop an augmented video signal, having an active portion and a blanking portion, the active portion of said augmented video signal representing a part of the image represented by said television signal;
   means, coupled to said processing means, for specifying first and second coordinate values defining a center point of the portion of said image to be represented by said augmented video signal;
   means, coupled to said processing means, for specifying a mangification factor to be used to interpolate the signals representing the portion of said image to produce said augmented video signal;
   means, coupled to said processing means, for adjusting the specified first and second coordinate values in response to said specified magnification factor to prevent the inclusion of signals representing the non active video portion of said television signal in the active portion of said augmented video signal.

3. A method for specifying a portion of a video signal representing a source image, said portion to be used to produce a signal representing an augmented image, comprising the steps of:
   specifying first and second coordinate values defining an image center point for the portion of said video signal;
   specifying a magnification factor defining image boundaries for the portion of said video signal; and
   modifying said first and second coordinate values responsive to said specified magnification factor to prevent portions of said video signal which do not represent said source image from being included in the signal representing said augmented image.

4. In a television signal processing system having apparatus for variably magnifying selected portions of an image, including memory means for storing the image from which the portion is selected and memory address means, responsive to starting addresses for providing memory addresses for reading the portion of the stored image to be magnified from said memory means, apparatus for generating horizontal and vertical starting addresses comprising:
   first means responsive to user control, for generating a first value representing a magnification factor;
   second means, responsive to user control, for generating second and third values respectively representing horizontal and vertical center coordinates of the selected portion;
   means, responsive to said first and second values, for generating a fourth value corresponding to said horizontal start address;
   means, responsive to said first and third values, for generating a fifth value corresponding to said vertical start address;
   means, responsive to said first value for generating a horizontal limit value and a vertical limit value respectively representing maximum horizontal and vertical starting addresses that may be utilized for the generated magnification factor;
   means, responsive to the horizontal limit value and said fourth value, for decreasing said fourth value when said fourth value exceeds said horizontal limit value; and
   means, responsive to said vertical limit value and said fifth value, for decreasing said fifth value when said fifth value exceeds said vertical limit value.

5. The system set forth in claim 4 wherein said second means includes means responsive to user control for incrementing or decrementing a count value and responsive to a further signal for decrementing said count value, and wherein said means for decreasing said fourth value includes a comparing means, responsive to said fourth value and said horizontal limit value for generating said further signal when said fourth value exceeds said horizontal limit value.

6. The system set forth in claim 4 wherein the respective means for decreasing the fourth and fifth values include means for adjusting the second and third values.

7. The system set forth in claim 4 wherein the means for decreasing the fourth value includes:
   means for generating the difference between the first value and a predetermined constant;
   means for generating a product equal to said difference multiplied by a second predetermined constant;
   means for combining said product with said fourth value to form a combined value;
   means for subtracting said combined value from said fourth value to produce a further difference; and
   means for providing as said horizontal starting address a zero value if said further difference has a first predetermined polarity and providing said further difference if said further difference has a polarity opposite said first predetermined polarity.

8. In a television signal processing system having apparatus for variably magnifying selected portions of an image, including memory means for storing the image from which the portion is selected and memory address means responsive to starting addresses for providing memory addresses for reading the portion of the stored image to be magnified, apparatus for generating horizontal starting addresses comprising:
   first means responsive to user control, for generating a first value representing a magnification factor;
   second means, responsive to user control, for generating a second value representing a center coordinate of the selected portion;
   means, responsive to said first and second values, for generating a third value corresponding to an adjusted center coordinate;
   means responsive to said third value for generating a fourth value corresponding to said horizontal starting address;
   means, responsive to said first value, for generating a horizontal limit value representing a maximum horizontal starting address that may be utilized for the generated magnification factor;

means, responsive to the horizontal limit value and said fourth value, for decreasing said fourth value when said fourth value exceeds said horizontal limit value.

9. In a video signal processing system for magnifying a portion of a source image represented by a signal including active and non active image segments defining a matrix of active and non active picture elements having respective horizontal and vertical coordinates, said portion being defined by a submatrix of said active picture elements, means for generating coordinates of a picture element of said matrix corresponding to a corner picture element of said submatrix comprising first means responsive to user control for generating first values representing coordinates of a picture element of said matrix corresponding to center coordinates of said submatrix; second means responsive to user control for generating second value representing a magnification factor, and means responsive to said first and second values for generating coordinates corresponding to said corner picture element of said submatrix whereby all picture elements of said submatrix are constrained to the active picture elements of said matrix, said last recited means including means responsive to said second values for adjusting said first values.

* * * * *